US010915675B2

(12) United States Patent
Pedersen et al.

(10) Patent No.: US 10,915,675 B2
(45) Date of Patent: Feb. 9, 2021

(54) STRUCTURAL OPTIMIZATION OF ADDITIVELY MANUFACTURED PARTS ACCOUNTING FOR MANUFACTURING-INDUCED STATES

(71) Applicant: Dassault Systemes Simulia Corp., Johnston, RI (US)

(72) Inventors: Claus Bech Wittendorf Pedersen, Hamburg (DE); Victor George Oancea, Johnston, RI (US)

(73) Assignee: DASSAULT SYSTEMES SIMULIA CORP., Johnston, RI (US)

( * ) Notice: Subject to any disclaimer, the term of this patent is extended or adjusted under 35 U.S.C. 154(b) by 436 days.

(21) Appl. No.: 15/661,726

(22) Filed: Jul. 27, 2017

(65) Prior Publication Data
US 2018/0330029 A1    Nov. 15, 2018

Related U.S. Application Data

(60) Provisional application No. 62/505,419, filed on May 12, 2017.

(51) Int. Cl.
*G06F 30/20* (2020.01)
*G06F 30/23* (2020.01)
(Continued)

(52) U.S. Cl.
CPC .............. *G06F 30/20* (2020.01); *G06F 30/23* (2020.01); *G06F 2111/10* (2020.01); *G06F 2119/18* (2020.01)

(58) Field of Classification Search
CPC .............. G06F 17/5009; G06F 17/5018; G06F 2217/12; G06F 2217/16
(Continued)

(56) References Cited

U.S. PATENT DOCUMENTS

| 10,253,836 B2 * | 4/2019 | Guest .................. F16F 7/00 |
| 2014/0214370 A1 * | 7/2014 | Olhofer ................ G06F 17/50 |
| | | 703/1 |

(Continued)

FOREIGN PATENT DOCUMENTS

WO    2015184495 A1    12/2015

OTHER PUBLICATIONS

Langelaar, M., *An additive manufacturing filter for topology optimization of print-ready designs*, Structural and Multidisciplinary Optimization 1-13 (2016).

(Continued)

*Primary Examiner* — Rehana Perveen
*Assistant Examiner* — Justin C Mikowski
(74) *Attorney, Agent, or Firm* — Armstrong Teasdale LLP

(57) ABSTRACT

An example embodiment designs a real-world object by defining a first model of the object being produced using an additive manufacturing (AM) process, where behavior of the object being produced is given by a first equation which includes a first plurality of corresponding sensitivity equations for a first plurality of design variables. Similarly, such an embodiment defines a second model of the object after being produced, wherein behavior of the object after being produced is given by a second equation which includes a second plurality of corresponding sensitivity equations for a second plurality of design variables. In turn, the second model is iteratively optimized with respect to a given one of the second plurality of design variables using both the first plurality of corresponding sensitivity equations and the second plurality of corresponding sensitivity equations.

18 Claims, 21 Drawing Sheets

(51) Int. Cl.
  *G06F 111/10* (2020.01)
  *G06F 119/18* (2020.01)
(58) Field of Classification Search
  USPC .............................................................. 703/6
  See application file for complete search history.

(56) References Cited

U.S. PATENT DOCUMENTS

| | | | | |
|---|---|---|---|---|
| 2016/0096318 | A1* | 4/2016 | Bickel | B29C 67/0051 |
| | | | | 264/40.1 |
| 2016/0246908 | A1* | 8/2016 | Komzsik | G06T 17/20 |
| 2017/0021565 | A1* | 1/2017 | Deaville | B29C 70/382 |
| 2017/0312986 | A1* | 11/2017 | Qian | G06F 7/00 |
| 2018/0007892 | A1* | 1/2018 | Farrugia | C09K 5/14 |
| 2018/0045953 | A1* | 2/2018 | Fan | G02B 27/0012 |
| 2018/0092690 | A1* | 4/2018 | Nair | G06T 17/00 |
| 2019/0001657 | A1* | 1/2019 | Matusik | B29C 64/386 |
| 2019/0224915 | A1* | 7/2019 | Hayashi | C08L 25/14 |

OTHER PUBLICATIONS

Langelaar, M., *Topology optimization of 3D self-supporting structures for additive manufacturing*, Additive Manufacturing 12:60-70 (2016).
Andrew T. Gaynor, *Topology Optimization Algorithms for Additive Manufacturing*, Ph.D. thesis, the Johns Hopkins University (2015).
Tosca Structure by Dassault Systèmes, Hackathon Challenge 4: Design a Bike Stem, pp. 1-8, (May 2017), www.3ds.com/events/science-in-the-age-of-experience/additive-manufacturing-symposium-hackathon.
A.M. Driessen, *Overhang constraint in topology optimization for additive manufacturing: a density gradient based approach*, Master thesis, Delft University of Technology (Feb. 2016).
Tortorelli, D. A. and Michaleris, P., *Design sensitivity analysis: Overview and review*, Inverse Problems in Engineering 1, 71-105 (1994).
Kleiber, M., Antunez, H., Hien, T. D. and Kowalczyk, P., *Parameter Sensitivity in Nonlinear Mechanics, Theory and Finite Element Computations*, John Wiley and Sons (1997).
Michaleris, P., Tortorelli, D. A. and Vidal, C. A., *Tangent Operators and Design Sensitivity Formulations for Transient Non-linear Coupled Problems with Applications to Elastoplasticity*, International Journal for Numerical Methods in Engineering 37: 2471-2499 (1994).
Vidal, C. A. and Haber, R. B., *Design Sensitivity Analysis for Rate-independent Elastoplasticity*, Computer Methods in Applied Mechanics and Engineering 107: 393-431 (1993).
Bendsøe, M. P. and Sigmund, O., *Topology Optimization: Theory, Methods and Applications*, Springer-Verlag, Berlin (2003).
Zegard, T. and Paulino, G.H., *Bridging topology optimization and additive manufacturing*. Structural and Multidisciplinary Optimization, 53:175-192 (2016).
Langelaar, M., *Developments in Topology Optimization for Additive Manufacturing*, 3D Printing Design & Engineering Conference (2015).
Hoffarth, M., *ALM Overhang Constraint in Topology Optimization for Industrial Applications*, $12^{th}$ World Congress on Structural and Multidisciplinary Optimisation, www.wcsmo12.org/, (Jun. 2017).
Extended EP Search Report, dated Oct. 19, 2018, for related European patent application No. EP 18171756.2.

* cited by examiner

330 ─→

331 — DEFINE, IN MEMORY OF A PROCESSOR, A FIRST MODEL OF A PHYSICAL OBJECT BEING PRODUCED USING AN ADDITIVE MANUFACTURING (AM) PROCESS, THE FIRST MODEL COMPRISING A FIRST PLURALITY OF DESIGN VARIABLES WHERE BEHAVIOR OF THE PHYSICAL OBJECT BEING PRODUCED USING THE AM PROCESS IS GIVEN BY A FIRST EQUATION WHICH INCLUDES A FIRST PLURALITY OF CORRESPONDING SENSITIVITY EQUATIONS FOR THE FIRST PLURALITY OF DESIGN VARIABLES

332 — DEFINE, IN THE MEMORY, A SECOND MODEL OF THE PHYSICAL OBJECT AFTER BEING PRODUCED USING THE AM PROCESS, THE SECOND MODEL COMPRISING A SECOND PLURALITY OF DESIGN VARIABLES WHERE BEHAVIOR OF THE PHYSICAL OBJECT AFTER BEING PRODUCED USING THE AM PROCESS IS GIVEN BY A SECOND EQUATION WHICH INCLUDES A SECOND PLURALITY OF CORRESPONDING SENSITIVITY EQUATIONS FOR THE SECOND PLURALITY OF DESIGN VARIABLES.

333 — BY THE PROCESSOR, ITERATIVELY OPTIMIZE THE SECOND MODEL OF THE PHYSICAL OBJECT WITH RESPECT TO A GIVEN ONE OF THE SECOND PLURALITY OF DESIGN VARIABLES USING BOTH THE FIRST PLURALITY OF CORRESPONDING SENSITIVITY EQUATIONS FOR THE FIRST PLURALITY OF DESIGN VARIABLES AND THE SECOND PLURALITY OF CORRESPONDING SENSITIVITY EQUATIONS FOR THE SECOND PLURALITY OF DESIGN VARIABLES

FIG. 3

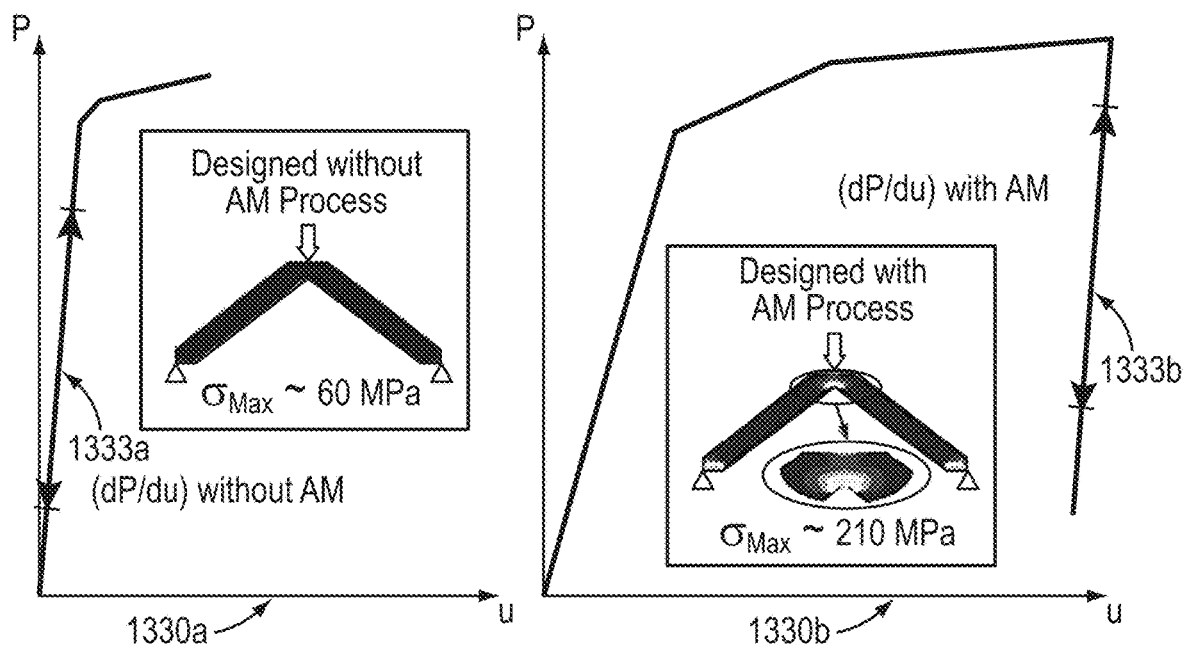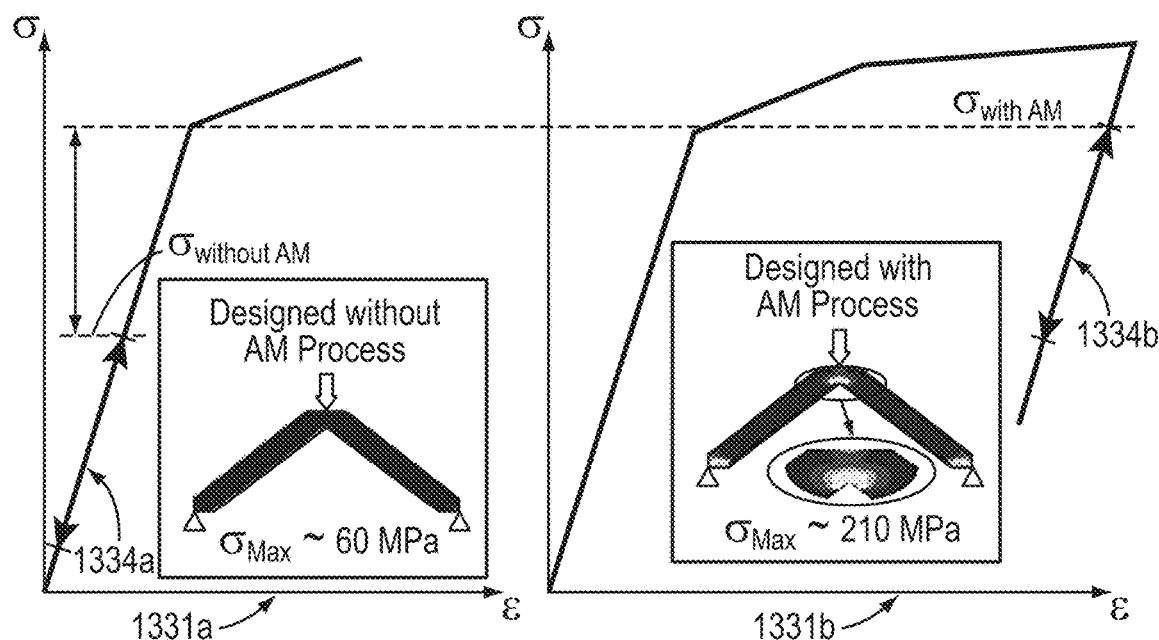
FIG. 13

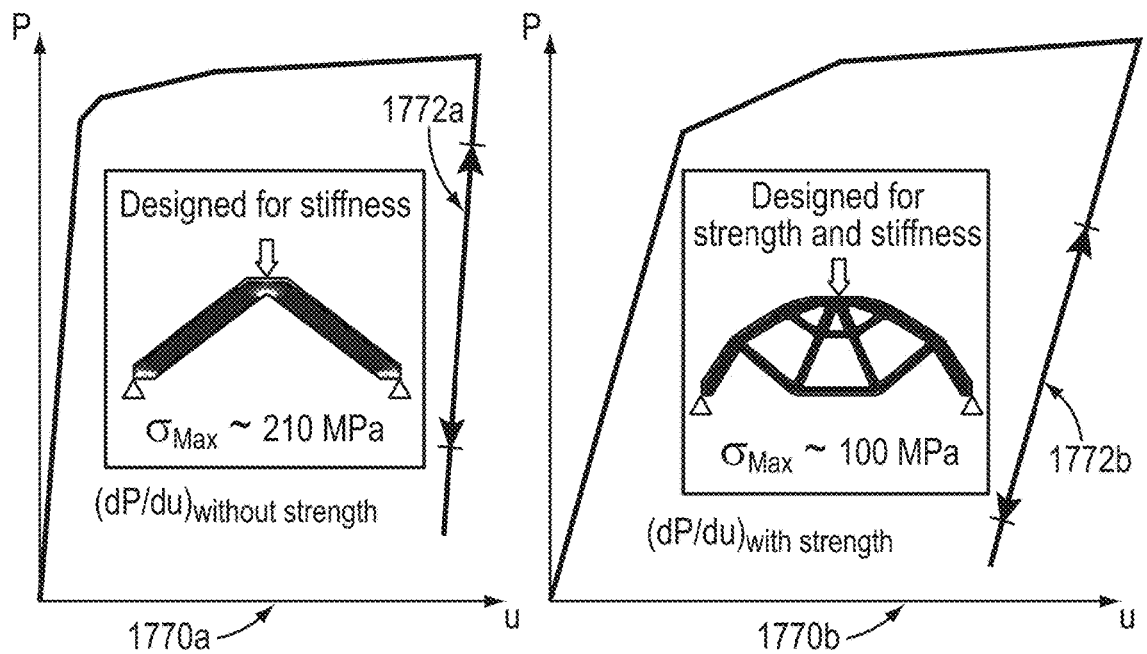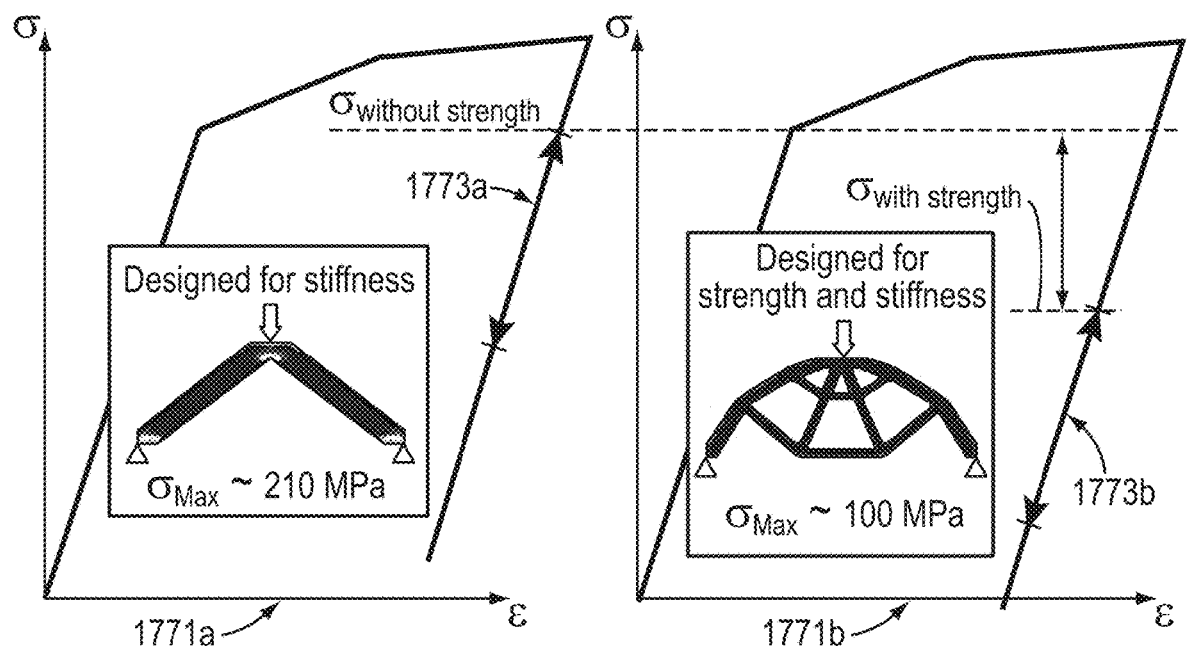
FIG. 17

STRUCTURAL OPTIMIZATION OF ADDITIVELY MANUFACTURED PARTS ACCOUNTING FOR MANUFACTURING-INDUCED STATES

RELATED APPLICATION

This application claims the benefit of U.S. Provisional Application No. 62/505,419, filed on May 12, 2017. The entire teachings of the above application are incorporated herein by reference.

FIELD OF INVENTION

Embodiments of the invention generally relate to the field of computer programs and systems, and specifically, to the field of computer aided design (CAD), computer-aided engineering (CAE), modeling, simulation, optimization, and production.

BACKGROUND

A number of systems and programs are offered on the market for the design of parts or assemblies of parts. These so-called CAD systems allow a user to construct and manipulate complex three-dimensional models of objects or assemblies of objects. CAD systems thus provide a representation of modeled objects using edges or lines, in certain cases with faces. Lines, edges, faces, or polygons may be represented in various manners, e.g., non-uniform rational basis-splines (NURBS).

These CAD systems manage parts or assemblies of parts of modeled objects, which are mainly specifications of geometry. In particular, CAD files contain specifications, from which geometry is generated. From geometry, a representation is generated. Specifications, geometries, and representations may be stored in a single CAD file or multiple CAD files. CAD systems include graphic tools for representing the modeled objects to the designers; these tools are dedicated to the display of complex objects. For example, an assembly may contain thousands of parts. A CAD system can be used to manage models of objects, which are stored in electronic files.

The advent of CAD and CAE systems allows for a wide range of representation possibilities for objects. One such representation is a finite element model (FEM). The terms finite element analysis (FEA) model, FEM, finite element mesh, and mesh are used interchangeably herein. A FEM typically represents a CAD model, and thus, may represent one or more parts or an entire assembly. A FEM is a system of points called nodes which are interconnected to make a grid, referred to as mesh.

The FEM may be programmed in such a way that the FEM has the properties of the underlying object or objects that it represents. When a FEM, or other such CAD or CAE model is programmed in such a way, it may be used to perform simulations of the object that it represents. For example, a FEM may be used to represent the interior cavity of a vehicle, acoustic fluid surrounding a structure, and any number of real-world objects and systems. When a given model represents an object/system and is programmed accordingly, it may be used to simulate the real-world object/system itself. For example, a FEM representing a stent may be used to simulate the use of the stent in a real-life medical setting.

Likewise, CAD, CAE, and FEM models may be used to improve the design of the objects that the model represents and likewise, the processes for manufacturing these objects. Design and process improvements may be identified through use of optimization techniques that run a series of simulations in order to identify changes to improve the design of the model and thus, the underlying object that the model represents as well the processes for manufacturing the underlying object.

SUMMARY OF THE INVENTION

While methods exist for optimization and simulation, these existing methods can benefit from functionality that improves their accuracy and computational efficiency and thus, embodiments of the present invention provide improvements to automated product and process design and production based upon optimization and simulation. Particularly, embodiments provide methods for service and life load optimizations that account for manufacturing induced stresses resulting from additive manufacturing (AM).

One such example embodiment provides a computer implemented method of designing a real-world physical object that begins by defining, in memory of a processor, a first model of a physical object being produced using an AM process, wherein the first model comprises a first plurality of design variables where behavior of the physical object being produced using the AM process is given by a first equation which includes a first plurality of corresponding sensitivity equations for the first plurality of design variables. To continue, such an embodiment defines, in the memory, a second model of the physical object after being produced using the AM process. The second model comprises a second plurality of design variables wherein behavior of the physical object after being produced using the AM process is given by a second equation which includes a second plurality of corresponding sensitivity equations for the second plurality of design variables. In turn, the method continues by the processor iteratively optimizing the second model of the physical object with respect to a given one of the second plurality of design variables using both the first plurality of corresponding sensitivity equations for the first plurality of design variables and the second plurality of corresponding sensitivity equations for the second plurality of design variables.

Another embodiment further comprises performing a simulation of producing the physical object through the AM process using the defined first model and then, using results from that simulation (the simulation of producing the physical object through the AM process) in defining the second model. In such an embodiment, using results from the simulation of producing the physical object through the AM process in defining the second model includes updating a value for a given design variable from the second plurality of design variables using the results from the simulation.

In yet another embodiment, at least one of the first plurality of corresponding sensitivity equations and the second plurality of corresponding sensitivity equations are adjoint sensitivity equations. An alternative embodiment further comprises manufacturing the physical object by controlling the AM process based on the iterative optimizing, e.g., using output of the iterative optimizing. Yet another embodiment further comprises modifying the AM process based on the iterative optimizing and further, manufacturing the physical object using the modified AM process where design of the physical object is based on the iterative optimizing.

According to an embodiment, the design variables include at least one of: a dimension, a thickness, a width, a radius, a composite material angle (angle(s) of materials in a composite), a sizing variable, a material interpolation variable for topology, a shape variable, and a bead variable. In an alternative embodiment, using the first plurality of corresponding sensitivity equations in iteratively optimizing the second model accounts for at least one of: a stress, a material parameter, a microstructure, and a deformation induced in the physical object by the AM process. Further, in another method embodiment, the iterative optimizing optimizes the second model with respect to at least one of: a service load and a life load. According to yet another embodiment, the first plurality of design variables includes design variables from the AM process and the iterative optimizing includes recalculating influence, on the AM process, of said design variables from the AM process in each optimization iteration using a consistent sensitivity-based approach. Further still, in another embodiment, iteratively optimizing the second model optimizes at least one of: a structural response, a computational fluid dynamics (CFD) response, a thermo-mechanical response, an electro-mechanical response, an electromagnetic response, an acoustic response, and a fluid-structural response of the second model.

An embodiment of the present invention is directed to a system, e.g., a computer based system, for designing a real-world physical object. Such a system comprises a processor and a memory with computer code instructions stored thereon, where the processor and the memory with the computer code instructions are configured to cause the system to design a real-world physical object according to any method described herein. For instance, in one example embodiment, the processor and the memory, with the computer code instructions, cause the system to define, in the memory, a first model of a physical object being produced using an AM process. The first model comprises a first plurality of design variables and behavior of the physical object being produced using the AM process is given by a first equation which includes a first plurality of corresponding sensitivity equations for the first plurality of design variables. Likewise, in such an embodiment, the processor and the memory, with the computer code instructions, cause the system to define, in the memory, a second model of the physical object after the object has been produced using the AM process. The second model comprises a second plurality of design variables where behavior of the physical object after being produced using the AM process is given by a second equation which includes a second plurality of corresponding sensitivity equations for the second plurality of design variables. In turn, according to such a system embodiment, the processor and the memory, with the computer code instructions, cause the system to iteratively optimize the second model of the physical object with respect to a given one of the second plurality of design variables. The iterative optimization uses both the first plurality of corresponding sensitivity equations for the first plurality of design variables and the second plurality of corresponding sensitivity equations for the second plurality of design variables.

In another embodiment of the system, the processor and the memory, with the computer code instructions, are further configured to cause the system to: (i) perform a simulation of producing the physical object through the AM process using the defined first model, and (ii) utilize results from the simulation of producing the physical object through the AM process in defining the second model. In such an embodiment, using the results from the simulation of producing the physical object through the AM process in defining the second model includes updating a value for a given design variable from the second plurality of design variables using the simulation results.

In yet another system embodiment, at least one of the first plurality of corresponding sensitivity equations and the second plurality of corresponding sensitivity equations are adjoint sensitivity equations. Like the aforementioned embodiment of the method, in an embodiment of the system, using the first plurality of corresponding sensitivity equations in iteratively optimizing the second model accounts for at least one of: a stress, a material parameter, a microstructure, and a deformation induced in the physical object by the AM process. Further, in another embodiment, the iterative optimizing optimizes the second model with respect to at least one of: a service load and a life load. According to yet another embodiment, the first plurality of design variables includes design variables from the AM process and the iterative optimizing includes recalculating influence, on the AM process, of said design variables from the AM process in each optimization iteration using a consistent sensitivity-based approach.

Further, in an alternative system embodiment, the processor and the memory, with the computer code instructions, are further configured to cause the system to manufacture the physical object by controlling the AM process based on the iterative optimizing. Similarly, in yet another system embodiment, the processor and the memory, with the computer code instructions, are further configured to cause the system to: (i) modify the AM process based on the iterative optimizing, and (ii) manufacture the physical object using the modified AM process, where design of the physical object manufactured using the modified AM process is based on the iterative optimizing.

Yet another embodiment of the present invention is directed to a cloud computing implementation for designing a real-world physical object. Such an embodiment is directed to a computer program product executed by a server in communication across a network with one or more clients. In such an embodiment, the computer program product comprises a computer readable medium which comprises program instructions, which, when executed by a processor, causes the processor to define, in memory of the processor, a first model of a physical object being produced using an AM process. The first model comprises a first plurality of design variables where behavior of the physical object being produced using the AM process is given by a first equation which includes a first plurality of corresponding sensitivity equations for the first plurality of design variables. Likewise, in such an embodiment, the program instructions, when executed, cause the processor to define, in the memory, a second model of the physical object after the object has been produced using the AM process. The second model comprises a second plurality of design variables, and behavior of the physical object after being produced using the AM process is given by a second equation which includes a second plurality of corresponding sensitivity equations for the second plurality of design variables. Further still, in such an example cloud computing embodiment, the program instructions, when executed, further cause the processor to iteratively optimize the second model of the physical object with respect to a given one of the second plurality of design variables using both the first plurality of corresponding sensitivity equations for the first plurality of design variables and the second plurality of corresponding sensitivity equations for the second plurality of design variables.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3 is a flowchart of a method of designing a real-world physical object according to an example embodiment.

FIG. 13 depicts plots showing stiffness and strength of an object designed according to an embodiment described herein and an object designed according an existing method.

FIG. 17 shows plots of stiffness and strength of two objects designed according to principles of embodiments of the present invention.

DETAILED DESCRIPTION OF THE INVENTION

Figure 1:
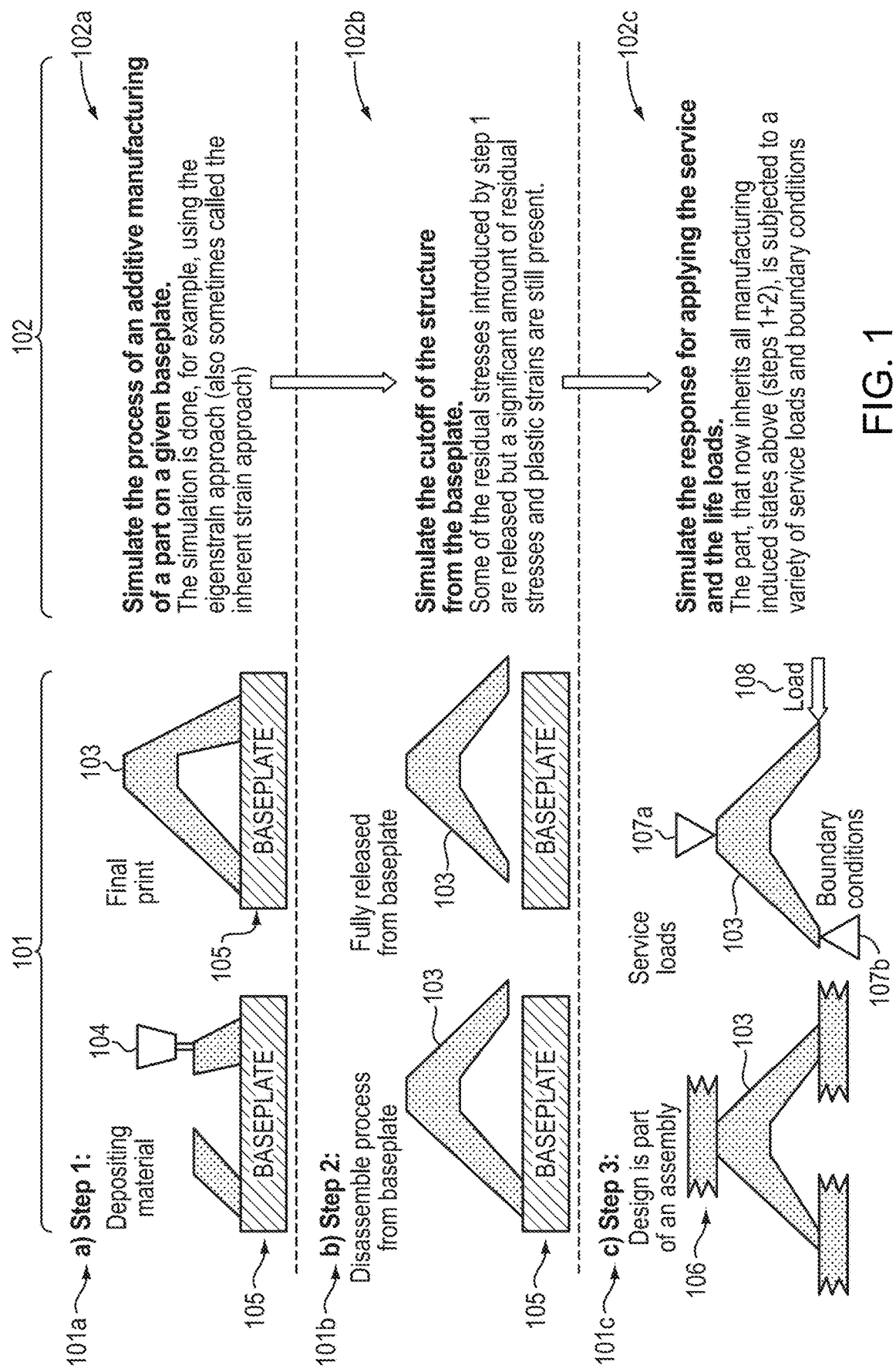
FIG. 1 graphically illustrates stages of constructing an object through additive manufacturing (AM) and deploying the manufactured object and a flow diagram of simulating the production and the deployment of the object.

A description of example embodiments of the invention follows.

The teachings of all patents, published applications and references cited herein are incorporated by reference in their entirety.

The term "sensitivities" is used herein, however, it is noted that sensitivities are mathematically equivalent to derivatives and the term sensitivities is commonly used in structural and multidisciplinary optimization. Further, it is noted, that embodiments may utilize any combination of analytical and numerical sensitivities. However, analytical sensitivities are generally favored for industrial optimization implementations when possible compared to strictly numerically computed sensitivities, such as total finite difference. Typically, analytical or semi-analytical sensitivities are more accurate and significantly cheaper in processor runtime to calculate compared to strictly numerically computed sensitivities.

Embodiments of the present invention greatly improve existing product design and manufacturing technologies. Specifically, embodiments provide more reliable structurally optimized designs, including topology optimized designs for parts manufactured via three-dimensional printing, i.e., additive manufacturing (AM). Similarly, embodiments also determine optimized methods for performing the additive manufacturing itself. Embodiments provide such functionality by accounting for manufacturing-induced residual stresses during optimization.

Recently, there has been a significant increase in the use and capability of AM technology. Additive manufacturing technology holds the promise of producing parts with astounding complexity while requiring fewer raw materials. Further, a paradigm shift in computer aided design (CAD) and computer aided engineering (CAE) is also taking place with structural optimization technology and especially, topology optimization technology, being at the center of the design process as the manufacturing constraints are, in principle, far fewer when compared to conventional manufacturing technologies. A variety of topology optimization technologies exist and they all account for the service and life loads that a physical object is subjected to. For instance, heuristics rule-based topology optimization constraints are often incorporated into existing optimization methodologies, such as those in Tosca, in a manner that places geometric restrictions on the computed design.

Additive manufacturing has the ability to revolutionize the way manufacturing is accomplished in many industries and applications. Additive manufacturing increases the design possibilities for structural designs having complex sizes, topologies, and shapes and therefore, can provide superior structural performance, increased stiffness, reduced weight, and increased strength, amongst other advantages, as compared to existing manufacturing methodologies. Often, these topologies and shapes designed to be produced via AM are either impossible to produce using traditional manufacturing techniques or are prohibitively expensive to manufacture using traditional manufacturing techniques.

However, while additive manufacturing holds significant promise, it does cause manufacturing induced stresses, i.e., stresses are induced into the object being produced as a result of the additive manufacturing process. These manufacturing induced defects such as residual stresses, anisotropies, surface quality, and local microstructures, amongst others, lead to subpar quality parts that in fact cannot sustain the service and life loads that the parts were designed to withstand. Embodiments of the present invention solve these problems by providing a holistic topology optimization approach that accounts for the manufacturing induced states in the service and life load optimization.

FIG. 1 illustrates the workflow 101 of manufacturing a physical object 103 via AM and the workflow 102 for simulating the manufacturing workflow 101. A first step 101a, of the AM workflow 101, progressively adds raw material and fuses the materials to previous layers or to a substrate (or base) 105 using a source of energy 104 to produce the part 103. Step 101a of the AM workflow 101 is typically accompanied by high temperature transients and gradients that induce inelastic strains (thermal, plastic, etc.) that lead to significant residual stresses and other less than desired features such as voids and undesirable microstructures in the part 103. The part 103 can distort during the print 101a, which can induce out-of-tolerance dimensional characteristics. Additional supporting structures to "prop" the part 103 up are usually employed to mitigate manufacturing limitations and to reduce distortions.

At step 102a, the simulation process 102, simulates the process of producing the part 103 through additive manufacturing using an eigenstrain approach, which can also be referred to as an inherent strain approach. While various simulation techniques exist for performing the simulation at step 102a, the simplest involves using the calibrated inelastic strain approach 102a (called eigenstrains or inherent strains) that when instantiated at various locations efficiently models thermal straining induced by the high temperature variations of the manufacturing process 101a. However, embodiments of the present invention are not limited to using the eigenstrain approach and may use any appropriate simulation method known in the art.

After step 101a of the manufacturing process 101, the part 103 is essentially fused to the base 105 and during step 101b the part 103 is detached (cutoff) from the base 105. Further, if the part 103 is manufactured using supports, the supports are detached as well during step 101b via a subtractive manufacturing process. This operation 101b induces some stress relaxation, which leads to additional distortions. After being detached, the part 103 may also be subjected to additional manufacturing protocols such as heat treatments, surface finishing operations, etc.

Step 102b of the simulation workflow 102 simulates cutting the part 103 off of the baseplate 105. During this process, some of the residual stresses introduced during step 101a are released but, a significant amount of residual stresses and plastic strains remain in the part 103. During step 102b, conventional simulation/optimization methods ignore the residual stresses and strains that remain in the part, however, in embodiments of the present invention, these remaining stresses and strains are accounted for in step 102b.

At step 101c the part 103 is deployed. For instance, the part 103 can be included in an assembly 106 where it is subject to boundary conditions 107a and 107b and the load 108. Step 102c of the simulation process 102 simulates the response of the part 103 under the service and life loads (generally referred to as the load 108). When simulating the use of the part 103 during step 102c, such an embodiment considers the manufacturing induced states inherited by the part 103 from the construction step 101a and the removal step 101b in addition to the variety of service loads and boundary conditions which can span many combinations. Thus, embodiments of the present invention simulate performance of the part 103 under the life and service loads 108 and the boundary conditions 107a and 107b while accounting for the manufacturing induced states.

Embodiments of the present invention address the challenges of simulating the AM process and the stresses and strains that are induced in an object produced through additive manufacturing. Embodiments provide functionality that can design, in an automated fashion, an optimized object while accounting for the intended service and life loads, intrinsic limitations of 3D printing technology, and the manufacturing induced states, e.g., state variables such as stresses, strains, and deformations.

As noted, embodiments can be used to design an optimized real-world physical object that conforms to service and life loads that the object is subjected to while deployed. In an embodiment, designing an optimized part to meet service and life load requirements may be done using existing software packages, such as Abaqus and Tosca in the Dassault Systemes portfolio, that are modified to implement the methods and systems described herein. In an example embodiment, an existing software package can be used to design a part to meet service and life load requirements that is optimized to have, for example, minimized weight.

While embodiments may leverage existing design tools to design a part optimized for service and life loads, there are no existing solutions that properly account for the manufacturing induced states of the part resulting from additive manufacturing. Thus, if one were to design a part simply using existing solutions, the part may seemingly be optimized and designed to conform to requirements but, when put into service, such a part may fail because existing solutions do not properly account for the manufacturing induced states that are a product of additive manufacturing.

Existing optimization technologies, such as: Langelaar, M., *An additive manufacturing filter for topology optimization of print-ready designs*, Structural and Multidisciplinary Optimization 1-13 (2016); Langelaar, M., *Topology optimization of 3D self-supporting structures for additive manufacturing*, Additive Manufacturing 12:60-70 (2016); Andrew T. Gaynor, *Topology Optimization Algorithms for Additive Manufacturing*, Ph.D. thesis, The Johns Hopkins University (2015); TOSCA Structure by Dassault Systemes, www.simulia.com; A. M. Driessen, *Overhang constraint in topology optimization for additive manufacturing: a density gradient based approach*, Master thesis, Delft University of Technology (2016), do not account for manufacturing induced states that result from AM. The aforementioned existing methods use heuristic based design rules for the optimization of AM designs. The heuristic based design rules place geometrical constraints on the computed designs. An example constraint in these heuristic based methods is avoiding and minimizing overhangs above a certain critical angle. These heuristic based constraints help avoid: (1) the need to use additional support structures during the AM process which causes greater raw material consumption during printing, (2) removal of the support structures after printing, and thus, (3) additional manufacturing costs. However, while these existing methods do improve the process for producing parts via AM, the existing solutions fail to account for manufacturing induced states.

Figure 2:
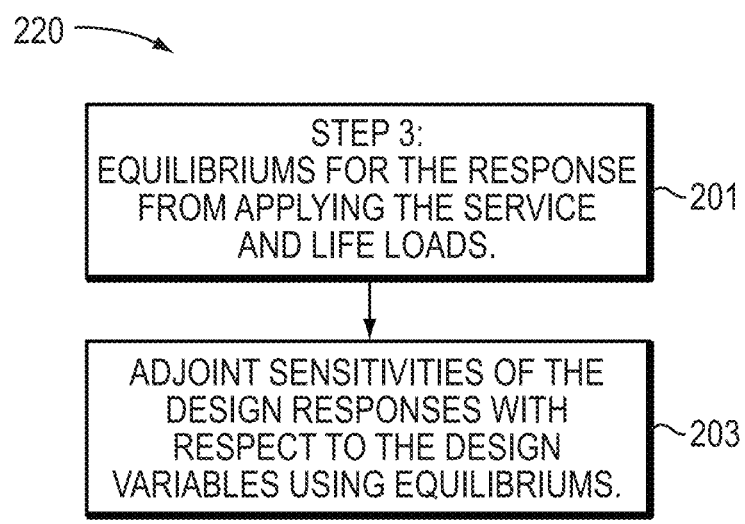
FIG. 2 is a flowchart of a method for determining sensitivities as part of a typical procedure for optimizing design of a physical object.

FIG. 2 depicts a typical sensitivity method 220 that can be used in optimizing a physical object produced via AM. At step 201, equilibriums for the response of the part from applied service and life loads are determined. In turn, at step 203, adjoint sensitivities of the design responses from step 201 with respect to design variables of the part using equilibriums are determined. This typical sensitivity method 220 does not account for the manufacturing induced states that result from additive manufacturing. Normally, when determining an optimized design, only the analyzing at step 201 is considered and it is commonly assumed that the material is residual free and the constitutive material modeling is isotropic. The method 220 is based upon adjoint sensitivities and ignores manufacturing induced states.

However, it is a wrong assumption to ignore the manufacturing induced states as in the method 220. Applying sensitivity based optimization for the service and life load cases as in the method 220 does not include the state variables from the modeling of the manufacturing process, e.g., steps 101a and 101b from the AM process 101 of FIG. 1. While methods such as, Tortorelli, D. A. and Michaleris, P., *Design sensitivity analysis: Overview and review*, Inverse Problems in Engineering 1, 71-105 (1994); Kleiber, M., Antunez, H., Hien, T. D. and Kowalczyk, P., *Parameter Sensitivity in Nonlinear Mechanics, Theory and Finite Element Computations*, John Wiley and Sons (1997); Michaleris, P., Tortorelli, D. A. and Vidal, C. A., *Tangent Operators and Design Sensitivity Formulations for Transient Nonlinear Coupled Problems with Applications to Elastoplasticity*, International Journal for Numerical Methods in Engineering 37: 2471-2499 (1994); Vidal, C. A. and Haber, R. B., *Design Sensitivity Analysis for Rate-independent Elastoplasticity*, Computer Methods in Applied Mechanics and Engineering 107: 393-431 (1993); use adjoint sensitivities with optimization workflows, such as the non-parametric optimization methods of Bendsøe, M. P. and Sigmund, O., *Topology Optimization: Theory, Methods and Applications*, Springer-Verlag, Berlin (2003); Zegard, T. and Paulino, G. H., *Bridging topology optimization and additive manufacturing*. Structural and Multidisciplinary Optimization, 53:175-192 (2016); Langelaar, M., *Developments in Topology Optimization for Additive Manufacturing*, 3D Printing Design & Engineering Conference (2015), these existing solutions fail to account for the manufacturing induced states that result from the AM process. Specifically, there are no existing technologies that utilize adjoint sensitivity techniques in a sensitivity based optimization workflow where the optimization is done for the service and design loads and also includes the state variables of the additive manufacturing simulation process in each optimization iteration through the equilibriums.

Ignoring manufacturing induced states in additively manufactured parts is a very limiting assumption that can lead, in certain situations, to significantly wrong designs. When designing for the service and life loads, no verified solutions exist on the commercial or academic market for an optimization workflow that accounts for manufacturing induced states in a sensitivity consistent fashion using iterative optimization methods. When determining an optimized design based on sensitivities as input for mathematically programming the sensitivities, the optimization method must be both numerically and mathematically sensible. However, this is not possible if the method does not consider manufacturing induced states.

Thus, enhancing current optimization techniques to account for additive manufacturing induced state variables is essential for obtaining correct optimized structural properties for when the designed parts are in service. If these states are not included and updated in each optimization iteration when optimizing the parts for use, then the designs can be fundamentally wrong and trial and error manufacturing and design corrections have to be done late in the design process. Taking such steps late in the process is costly, time consuming, and does not yield the best performing design.

Applicants provide improved optimization methods and systems. FIG. 3 illustrates one such example method 330 for designing an optimized real-world physical object produced through additive manufacturing that considers the manufacturing induced states. The method 330 begins at step 331 by defining, in memory of a processor, a first model comprising a first plurality of design variables. In the method 330, the model defined at step 331 represents a real-world physical object/system being produced through an AM process. Behavior of the model (mimicking behavior of the subject real-world object/system) and associated properties (including AM production process properties) are given by a first equation which includes a first plurality of sensitivity equations corresponding to the first plurality of design variables. Similarly, the method 330 continues at step 332 by defining, in the memory, a second model of the physical object after the object has been produced using the AM process. This second model defined at step 332 comprises a second plurality of design variables where behavior of the object after being produced is given by a second equation which includes a second plurality of corresponding sensitivity equations for the second plurality of design variables. In this way, step 331 defines a model of an object being produced through AM and step 332 defines a model of that object after that object has been produced.

According to an embodiment of the method 330, defining the models at steps 331 and 332 may include defining the respective equations and terms of the equations such that each equation, for example, when solved, yields a result that describes behavior of the first and second models. To illustrate, in an example embodiment where the physical object is a door hinge, the first equation defined at step 331 would describe the properties of the hinge as it is being produced by a 3D printing process and properties of the printing process, such as the stresses and strains on the hinge as well as the material of the hinge and heating properties of producing the hinge. Likewise, the second equation defined at step 332 would describe the properties of the hinge after it has been produced, such as the expected operating conditions, e.g., service loads that the hinge would be subject to and the material properties of the hinge after production. Defining the model in steps 331 and 332 may include defining operating conditions so as to facilitate the method 330 optimizing the model of the object under operating conditions of interest as well optimizing the AM process of producing the object.

The method 330 requires that the equations of steps 331 and 332 include corresponding sensitivity equations for the first and second plurality of design variables. Thus, in an example embodiment, the equations may include a corresponding sensitivity equation for each design variable. Further, in an alternative embodiment, multiple sensitivity equations are included for one or more design variables. Further still, in yet another embodiment, sensitivity equations are not included for each design variable, and instead, sensitivity equations are only included for design variables of interest. In an embodiment, at least one of the first plurality of corresponding sensitivity equations and the second plurality of corresponding sensitivity equations are adjoint sensitivity equations.

According to an embodiment of the method 330, the models defined at step 331 and 332 may be defined according to any method known in the art. Further, while models may represent real-world physical systems, embodiments are not so limited and the models, may represent any system, whether real or contemplated, where an optimized design of the system is desired. Example systems include vehicles, buildings, medical devices, sports equipment, airplanes, military weapons, and components of said systems. In an embodiment, the models defined at steps 331 and 332 may be any computer based models, e.g., a CAD model or finite element model, known in the art.

Likewise, the design variables may be any design variables that can be associated with the physical object and any design variables that can be associated with producing the physical object through additive manufacturing. Example design variables include, but are not limited to: a dimension, a thickness, a width, a radius, a composite material angle, a sizing variable, a material interpolation variable for topology, a shape variable, and a bead variable. Further, it is noted that while the first model defined at step 331 represents an object being produced using AM and the second model defined at step 332 represents the object after it is produced using the AM process, in an embodiment of the method 330, the first plurality of design variables (associated with the first model) and the second plurality of design variables (associated with the second model) may include some of the same design variables. For instance, the first plurality of design variables and the second plurality of design variable may each include a material property design variable.

At step 332, an example embodiment of the method 330 utilizes a simulation to define the design variables that the first model and the second model have in common, i.e., design variables found in both the first and second plurality of design variables. In such an example embodiment, a simulation of producing the physical object through the AM process is performed using the first model defined at step 331. In turn, results of the simulation are used in defining the model at step 332. In an example embodiment, using results from the simulation of producing the physical object through the AM process in defining the second model includes updating a value for a given design variable from the second plurality of design variables using the results.

At steps 331 and 332, according to a computer implemented embodiment of the method 330, the memory is any memory communicatively coupled or capable of being communicatively coupled to the computing device performing the method 330. Likewise, the processor is any processor known in the art and may also include any number of processors in a distributed computing arrangement.

To illustrate steps 331 and 332 consider a simplified example where a hinge is being constructed and the method 330 is used to optimize design of the hinge and the AM process for producing the hinge. At step 331, a finite element model is defined, in computer memory, that reflects all of the properties of the hinge as it is being constructed as well as properties of the AM process used to construct the hinge, e.g., the dimensions, materials, and heating properties. The model also includes several design variables, e.g., material thickness and hole placement. Further, the behavior of the hinge being produced by the AM process is governed by an equation, known in the art, and this equation includes a respective sensitivity equation for material thickness. Similarly, at step 332, a finite element is defined of the hinge, in computer memory, that reflects all of the properties of the hinge after it has been constructed, e.g., the dimensions, materials, stresses, strains, etc., and the model includes design variables, e.g. material thickness and hole placement. Similarly, to step 331, at step 332 behavior of the hinge after being produced by the AM process is governed by an equation, known in the art, and this equation includes a respective sensitivity equation for material thickness The method 330 continues at step 333 by the digital processor, iteratively optimizing the second model of the physical object defined at step 332, with respect to a given one of the second plurality of design variables. Step 333 uses both the first plurality of corresponding sensitivity equations for the first plurality of design variables and the second plurality of corresponding sensitivity equations for the second plurality of design variables. In an embodiment, the iterative optimizing at step 333 may utilize both the first equation and the second equation. According to an example embodiment, the iterative optimizing at step 333 may be performed using mathematical programming, e.g., optimization computations, techniques, and methods that are known in the art, that are modified to use both the first plurality of corresponding sensitivity equations for the first plurality of design variables and the second plurality of corresponding sensitivity equations for the second plurality of design variables. Thus, embodiments may utilize an existing software suite for performing optimization but modify the existing software to implement the method 330. In an example embodiment of the method 330, optimizing the model at step 333 optimizes at least one of: a structural response, a computational fluid dynamics (CFD) response, a thermo-mechanical response, an electro-mechanical response, an electromagnetic response, an acoustic response, and a fluid-structural response of the second model. Further, at step 333, the second model may be optimized with respect to a plurality of design variables.

As is known in the art, optimization methods are performed iteratively, i.e., small changes are made to a model (e.g., design variables are modified) for a given iteration, and it is determined whether behavior of the model complies with desired specifications. According to an example embodiment of the method 330, at step 333, in a given iteration, behavior of the model is determined in steps, where at various steps an equilibrium is reached. In an example embodiment, the iterative optimizing at step 333 optimizes the second model with respect to at least one of a service load and life load. Thus, in an example embodiment, changes are made to the second model to determine an optimized model that meets service and life load requirements. As described herein, existing methods for optimization do not account for manufacturing induced states from additive manufacturing when performing iterative optimization. In contrast, the method 330 at step 333, through use of both the first plurality of sensitivity equations and the second plurality of sensitivity equations, accounts for manufacturing induced stresses that are in the part produced through additive manufacturing. According to an embodiment, the first plurality of design variables includes variables from the AM process and the iterative optimizing at step 333 includes recalculating influence, on the AM process of said design variables from the AM process in each optimization iteration using a consistent sensitivity-based approach. Further, in another example embodiment, using the first plurality of corresponding sensitivity equations in iteratively optimizing the second model accounts for at least one of: a stress, a material parameter, a microstructure, and a deformation induced in the physical object by the AM process. According to yet another embodiment, the first and second plurality of sensitivity equations used at step 333 may be based upon equilibriums determined through simulations of the AM production process and the part after production. For instance, a set of sensitivity equations may be based upon the equilibriums for the service and life load and another set of sensitivity equations may be based upon the equilibriums for the service and life load which are also a function of the equilibriums for the AM process.

According to an embodiment of the method 330, optimizing the second model at step 333 includes modifying the second model based upon a sensitivity solution of the design response sensitivity of the given design variable. For instance, in an example, the sensitivity solution may indicate that increasing the value of the given design variable would allow the optimization to move closer to achieving desired performance and thus, the optimization would modify the design variable as such when performing the iterative optimization at step 333. Thus, such a modification may include modifying the given design variable in a direction indicated by the solution of the design response sensitivity. Likewise, the iterative optimizing at step 333 may determine a parameter value for the given design variable.

To illustrate step 333, consider the aforementioned hinge example where the design variable of interest is material thickness. In this example embodiment of the method 333, it is desired to optimize material thickness (i.e., minimize), while still allowing the hinge to conform to a load standard. In such an example embodiment, the hinge model defined at step 332 is used in an iterative optimization that uses both the first plurality of sensitivity equations and the second plurality of sensitivity equations. To perform this optimization, the equation of the second model of the hinge, along with the first and second pluralities of sensitivity equations, are used in mathematical programming, to determine a minimum material thickness that will comply with the service and life load requirements. In an embodiment, the mathematical programming may be any known mathematical programming that is modified to operate in accordance with the methods described herein. In mathematics, computer science, and operations research, mathematical programming is alternatively referred to as mathematical optimization or simply optimization, and it refers to a process of the selection of a best solution (with regard to some criterion) from some set of available alternatives. While mathematical programming exists that utilizes sensitivities, solutions do not exist that consider sensitivities from both the AM process and the use of the part after the AM process. Through such functionality, an optimized design of a hinge produced through the AM process can be determined. In contrast, existing methods do not account for manufacturing induced stresses and strains that result from the AM process and thus, a hinge that is optimized without using both the first and second pluralities of sensitivity equations may fail once deployed in the real-world.

While the method 330 determines an optimized design of the physical object, an alternative embodiment may further create the optimized physical object. In such an example embodiment, the method 330 further comprises manufacturing the physical object by controlling the AM process based on the iterative optimizing. For example, such functionality may include controlling an AM machine to produce a physical object that conforms to the optimized design determined at step 333. According to yet another embodiment, the method 330 optimizes the AM process itself based upon results of the iterative optimization of step 333. Thus, such an embodiment may further comprise modifying the AM process based on the iterative optimizing and manufacturing the physical object using the modified AM process. In such an example embodiment, design of the physical object manufactured using the modified AM process may be based on the iterative optimizing of step 333. Example embodiments of the method 330 may modify the AM process so as to improve the AM process and the part produced by the process. For example, AM induced residual stresses are often extremely high. An embodiment may modify the printing path of the AM process to lead to a different distribution of the residual stresses. In such an embodiment, the optimization method can be used to determine the locations of the stresses when the part is produced using the different printing path and thereby, obtain a design that accounts for the state variable changes as the residual stress changes due to the changes to the AM process. In this way, an embodiment may also determine a print path for the AM process to produce an optimized object.

Embodiments of the present invention, such as the method 330, include additive manufacturing process induced states in iterative sensitivity-based optimizations, such as structural design. In one such example embodiment, this is accomplished by including the state variables from the additive manufacturing process simulation at each iteration of the optimization process. According to an embodiment, the state variables from the AM process may be included at each iteration of the optimization process through the modeling of the equilibriums. Further, in an embodiment, each optimization iteration may include solving for equilibriums under the service and life load cases, which, are used as drivers for the design targets. In such an embodiment, the state variables, i.e., design variables, from the additive manufacturing simulation and the influence of the state variables on the design sensitivities are recalculated in each optimization iteration using a consistent sensitivity based approach.

Embodiments of the present invention can be used to address sensitivity solutions for structural optimization disciplines, such as topology optimization, shape optimization, sizing optimization, and bead optimization. However, embodiments are not limited to structural optimization disciplines and may also be used for multi-physics optimizations, such as, thermo-mechanical, electro-mechanical, and fluid-structure interaction optimizations.

Through the optimization techniques described herein embodiments provide significant improvements over existing methods. Particularly, embodiments provide greatly improved methods for optimizing the functional performance for service and life loads by including state variables from additive manufacturing processes. Further, embodiments improve manufacturability, i.e., the ability to actually manufacture (implement manufacturing of) the designed object. For instance, embodiments account, in a comprehensive and sensitivity-consistent fashion for the manufacturing induced states (stresses, defects, etc.) which yields optimized designs that are more realistic and that can actually be additively manufactured. Embodiments also reduce post processing activities, such as removal from the build plate and thermal treatment, that are common using current additive manufacturing techniques. Because embodiments account for physical and other states induced by AM operations in the design of the physical object, the object can be designed to reduce manufacturing costs related to post printing activities using the principles described herein.

In addition to the aforementioned advantages, embodiments also reduce warping in the designed part. Embodiments help control the residual stresses in the final design so that warping is minimized and the printed part can be incorporated into an assembly of parts more easily. Likewise, embodiments determine an enhanced residual stress design. For example, an embodiment may determine an object design that benefits from the residual stresses and material properties induced in the part by the additive manufacturing process. Examples of such designs may optimize the principal stresses in compression from the additive manufacturing to achieve fatigue resistant structures or leverage the manufacturing induced material anisotropy to be located in the force carrying directions.

Figure 4:
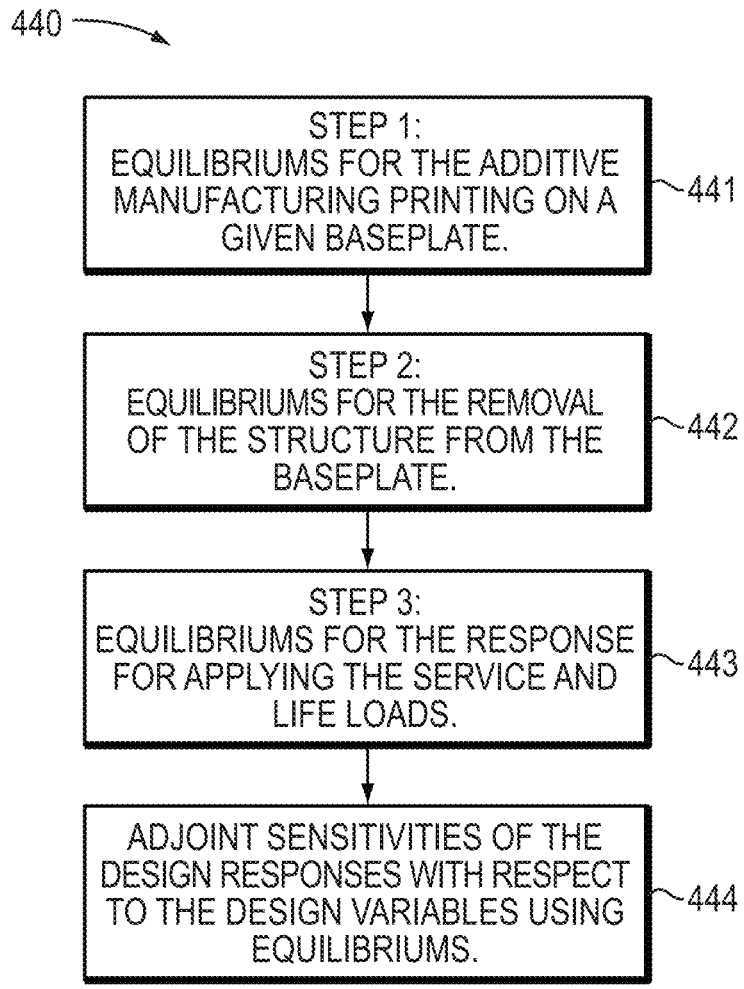
FIG. 4 is a flowchart of a method of determining sensitivities as part of a procedure for designing a real-world object according to the principles of an example embodiment.

As noted hereinabove, embodiments enhance existing optimization methodologies, such as the standard density topology optimization techniques described in Bendsøe, M. P. and Sigmund, O., *Topology Optimization: Theory, Methods and Applications*, Springer-Verlag, Berlin (2003) and Zegard, T. and Paulino, G. H., *Bridging topology optimization and additive manufacturing. Structural and Multidisciplinary Optimization*, 53:175-192 (2016). An example standard sensitivity workflow 220, which can be used as part of an optimization procedure, is described hereinabove in relation to FIG. 2. The standard sensitivity workflow 220 can be contrasted with the sensitivity work flow 440 of FIG. 4 which, at least steps at 441 and 442, accounts for the state variables from the AM process. The flowchart of FIG. 4 illustrates an example workflow 440 for determining sensitivities as part of an optimization method for designing a structural component using a computer implemented workflow that includes the state variables from the additive manufacturing simulation process at steps 441 and 442. At step 441, equilibriums for the additive manufacturing printing on the baseplate are determined and likewise, at step 442, equilibriums for disassembling the structure from the baseplate are determined. According to an embodiment, the equilibrium of the entire system, i.e., the part and the AM process are determined at step 441, and likewise, the equilibrium of the entire system of removing the part from the base plate is determined at step 442. Subsequently, at step 443 the workflow 440 determines equilibriums for the part's response to applied service and life loads and at step 444, adjoint sensitivities of the design responses with respect to the design variables are determined using the equilibriums from steps 441-443. According to an embodiment, the equilibriums may be determined by performing respective simulations of the system, i.e. part, during the system's various stages, e.g., production (441), removal from the baseplate (442), and subject to service and life loads (443). According to an embodiment, the system may be represented by a computer based model, such as a finite element model and this model may be used in the simulations to determine the equilibriums. Further, in an embodiment of the method 440, the state variables determined at one or more steps of the method 440 may be transferred to the next step, e.g., from step 442 to 443, so as to include the properties of the model through the various stages, e.g., production via AM and use. The workflow 440 determines the sensitivities as part of a method for optimizing the functional design responses of the simulation for the service and life loads based on adjoint sensitivities of the design responses. Through the functionality of steps 441-444, the method 440 provides optimization functionality that is based upon adjoint sensitivities using (i) the state variables of the manufacturing process simulation and (ii) of the removal process simulation, as inputs for the equilibriums of the service and life loads for the given design variables.

Figure 5:
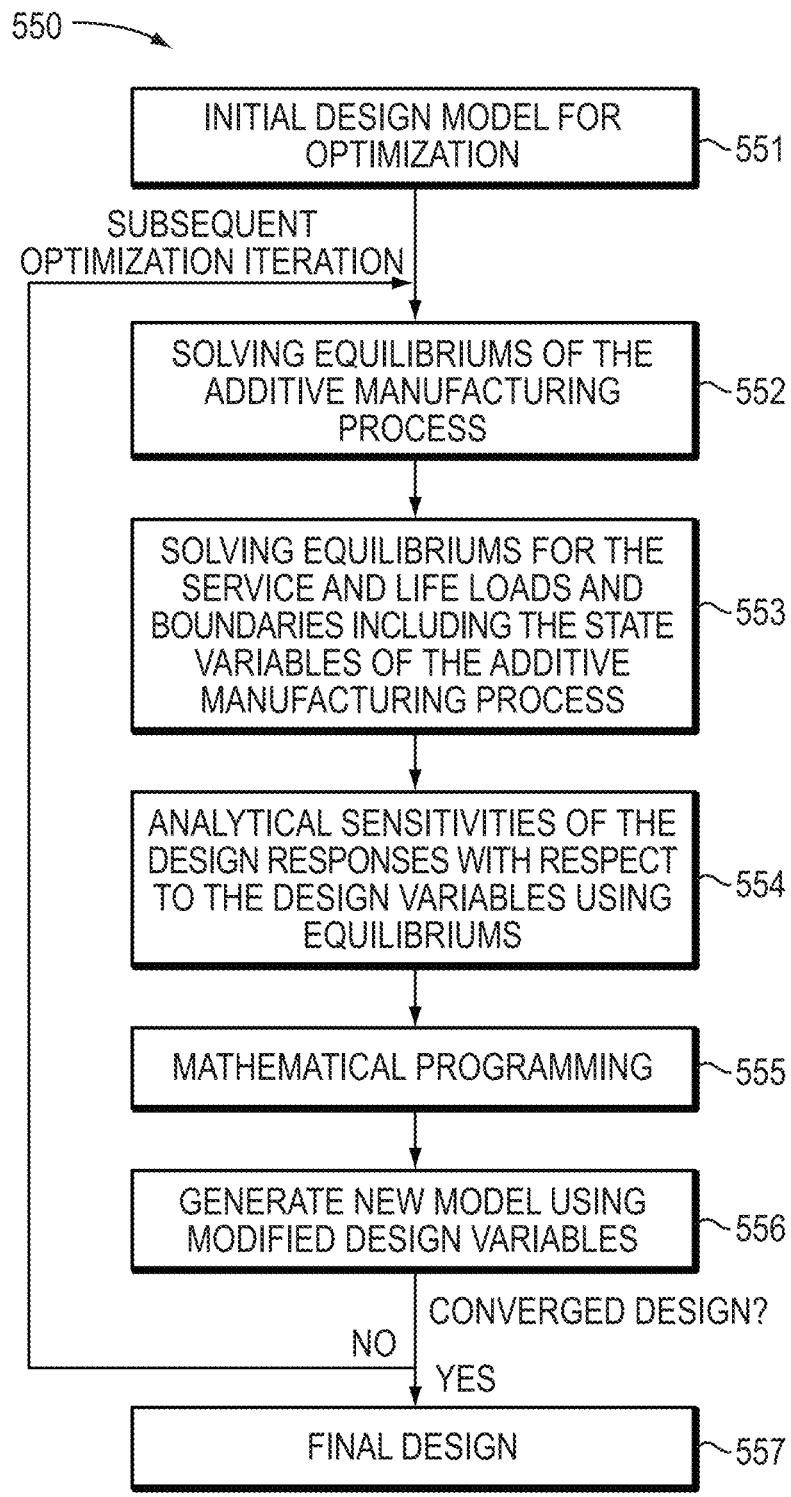
FIG. 5 is a flow diagram of an iterative design process implementing an embodiment of the present invention.

FIG. 5 illustrates an optimization workflow 550 according to an example embodiment of the present invention. The method 550 provides an iterative design process that: (i) designs an object with respect to service and design loads, (ii) includes the state variables from the additive manufacturing process and further, (iii) updates the state variables from the additive manufacturing process in each optimization iteration. Thus, the method 550 is an iterative design process using model sensitivities for the equilibriums of the service and life loads where the initial state for the equilibriums of the service and life loads are sequential and dependent upon the state variables of the equilibriums from the additive manufacturing process. The method 550 can be implemented, for example, in a predefined workflow of a computer-aided engineering (CAE) system.

The method 550 begins at step 551 with a designer creating an initial model for optimization that includes material properties and the various loading and boundary conditions for the equilibriums of the additive manufacturing process. The model also includes service and life loads for the subsequent equilibriums of the additive manufacturing process. Next, the model to be optimized which is created at step 551, is employed in the iterative design process of steps 552 to 557.

At step 552 equilibriums for the additive manufacturing process are determined and at step 553 equilibriums for the service and life loads and boundaries including the state variables of the additive manufacturing process are solved. At step 554, the method 550 determines for each optimization iteration (which includes the steps 552-556) the design responses (e.g., for stiffness, displacements, reaction forces, stresses, mass, etc.) of the equilibriums determined at steps 552 and 553 with respect to the design variables (e.g., topology variables, shapes, sizing as thicknesses, lengths, laminate angles, etc.). At step 554 the analytical sensitivities (i.e., derivatives) of the design responses with respect to the design variables may also be determined.

To continue, at step 555 the design responses are applied to define an optimization problem that comprises constraints which have to be fulfilled and an objective function which is to be optimized. At step 555 the optimization problem is solved using mathematical programming e.g., optimization computations, techniques, and methods. According to an embodiment, the mathematical programming of step 555 is based upon values of a user defined design target stated by the design responses and by the sensitivities of the design responses. In such an embodiment, the design responses and the sensitivities of the design responses are inputs for the mathematical programming so as to achieve an industrial target optimized design in a reasonably low number of optimization iterations. In the optimization iterations, the design problem is characterized by having a high number of design variables (e.g., topology variables, shapes, sizing such as thicknesses, lengths, laminate angles, etc.) compared to the number of design responses (e.g., stiffness, displacements, reaction forces, stresses, mass, etc.). According to an embodiment, the design target(s) are defined by the design responses applied in defining an optimization problem consisting of constraints which have to be fulfilled and an objective function which is either minimized or maximized.

Next, at step 556, a new model is generated using modified design variables determined through the mathematical programming of step 555. When implemented, the design variables determined at steps 554 and 555 and the physical model variables determined at step 556 for generating the new model may be the same, e.g., thickness for a sizing optimization. In other cases, the design variables and the physical models may be different, as for example, in density topology optimization where the relative densities which are design variables are mapped to the physical densities.

After generating the model at step 556 it is determined if the optimization has converged. If the optimization has not converged a new optimization cycle (steps 552-556) is performed. If the optimization converges, the final design is outputted at step 557. For the converged design, the constraints for the design responses are fulfilled and the objective function is optimized.

Herein below, in relation to FIGS. 6-17 example implementations of an embodiment are described along with results of such implementations.

The modeling of additive manufacturing processes can be very complex and computationally intensive and such modeling often involves sophisticated multi-scale and multi-physics computations. Although embodiments of the present invention can incorporate such sophisticated computations, for purposes of the below described implementations, a simplified approximate approach is employed. In this simplified approach, the printing process simulation is based on the so-call eigenstrains, i.e., inherent strain, approach. The eigenstrain approach assumes that the mechanical response of the part being printed can be captured by an inelastic strain. The inelastic strain can either be computed from detailed multi-physics simulations or calibrated from simple experiments.

Figure 6:
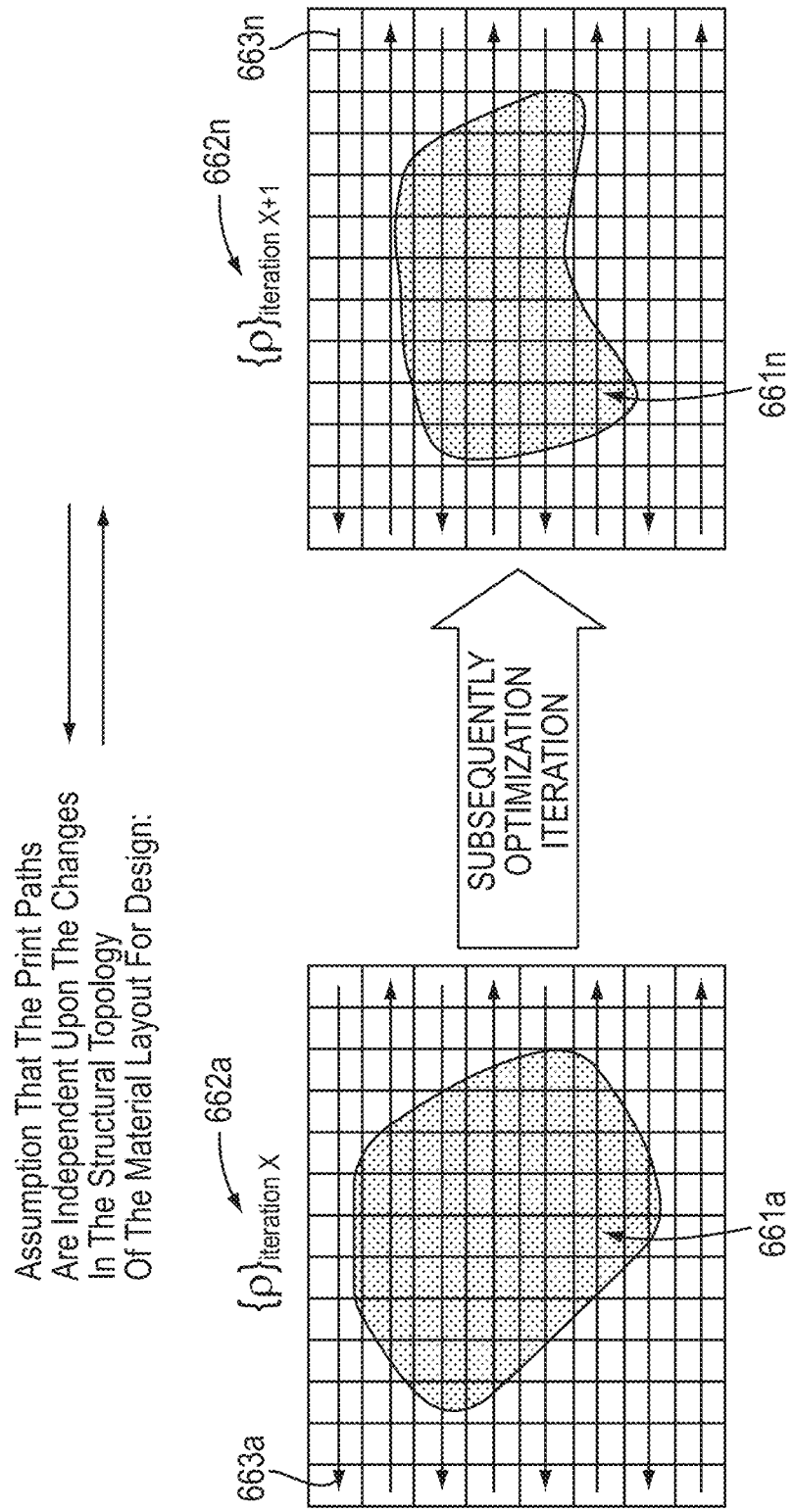
FIG. 6 illustrates the structural topology of an object determined using principles of an embodiment.

Further, for the approximate approach used in the implementations discussed below, the eigenstrain is assumed to be independent of the optimized topology of the design. This is shown in FIG. 6 which depicts an elemental density based topology optimization where each element has a relative material density between ~0 (void material) and 1 (solid material) yielding a material layout for a given design. A relative density between ~0 and 1 is called intermediate. FIG. 6 depicts material distributions 661a and 661n from the optimization iterations 662a and 662n. During the iteration 662a the material has the distribution 661a and during the iteration 662n the material has the distribution 661n. Despite the differing material distributions 661a and 661n, each finite element of a model representing the distributions has the same eigenstrain independent of the printing path (shown by the arrows 663a and 663n) and printing direction. Each finite element has the same eigenstrain independent of relative density being void, intermediate, or solid material for the elemental density based topology. Thus, eigenstrain is independent of the optimized topology of the design. Further, it is assumed that the printing direction does not introduce any material anisotropic or orthotropic behavior as a function of the printing direction and path. An isotropic elastoplastic constitutive material model is employed in the below described examples.

Figure 7:
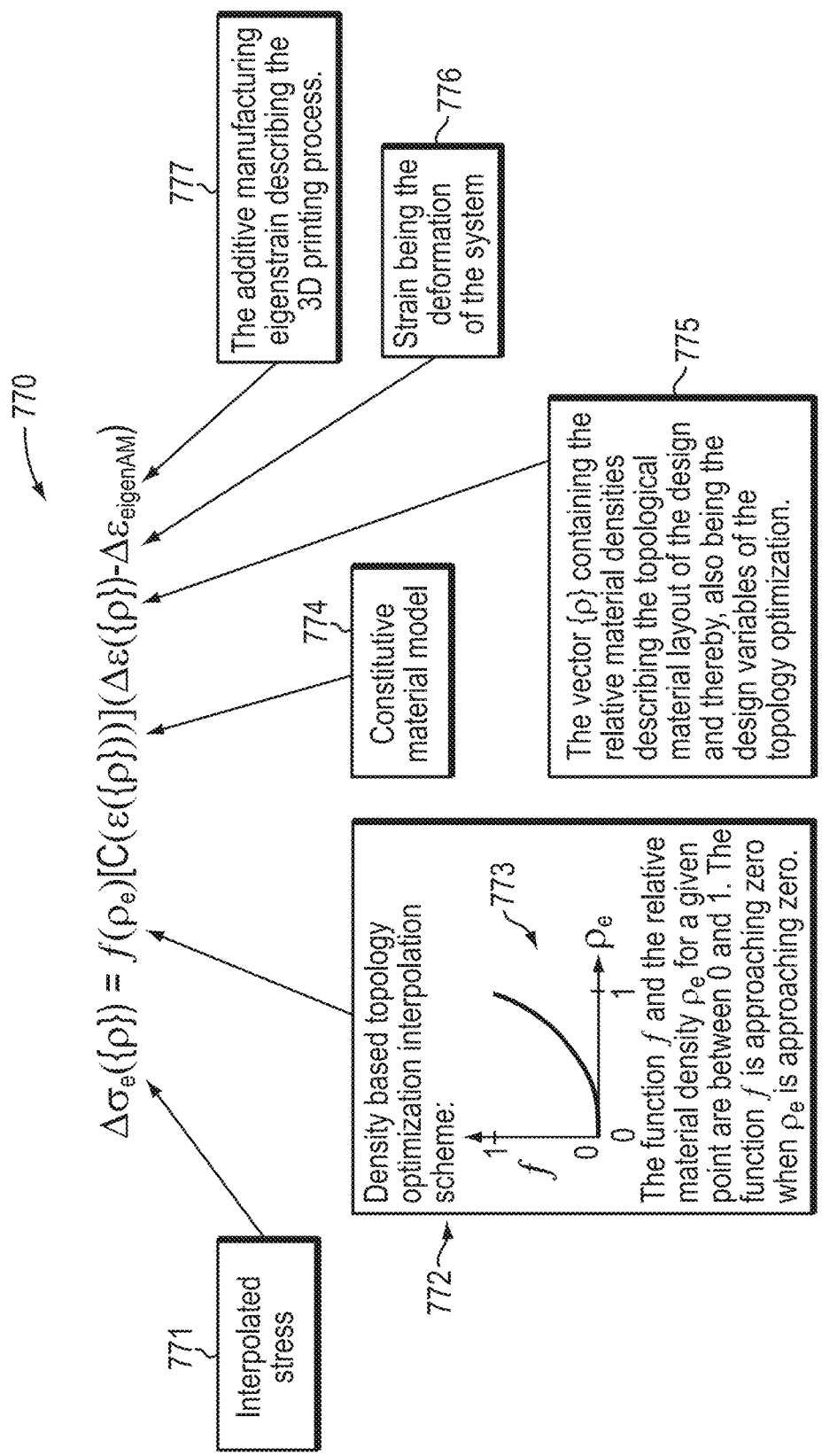
FIG. 7 is an equation for a material interpolation scheme that may be employed in embodiments.

Further still, in the below described example implementations, for the density based topology optimization, a material interpolation scheme for the constitutive material model is used which includes the eigenstrain approach modeling the additive manufacturing 3D printing process. The equation 770 of FIG. 7 shows that the interpolated stress 771 as a function of the vector p is a function of the density based topology scheme 772 which is given by the function 773, the constitutive material model 774, the vector p 775 which contains the relative material densities describing the topological material layout of the design and thereby, also being the design variables of the topology optimization, the strain 776 which is the deformation of the system being optimized, and the additive manufacturing eigenstrain 777 which describes the 3D printing process. According to an embodiment, by using the equation 770, the densities and thereby, the design are modified in each optimization iteration. Thus, the interpolated stresses are changed in each optimization iteration initiating new equilibrium states in each optimization iteration.

In addition to modeling the additive manufacturing process, the example implementations also model the removal of the part from the build plates. Removing the part from the build plate can be a physically complex process and again, sophisticated numerical techniques can be employed to account for the removal procedure. For the purpose of these examples it is assumed that the disassembling of the printed part from the base plate (e.g., step 101b from FIG. 1) occurs instantaneously and symmetrically, and an isotropic elastoplastic constitutive material model is used similarly to the printing step (e.g., step 101a from FIG. 1.)

In regards to the modeling of the service loads and life loads and corresponding boundary conditions, the example implementations assume that the additional deformation by the service and life load cases is elastic.

It is noted that embodiments of the present invention are not limited to the aforementioned assumptions and simplifications, and thus, can be extended to all sensitivity based optimization design workflows and herein, these assumptions are used merely to provide illustrative and understandable examples that illustrate some of the strengths of the embodiments described herein.

In these examples, the finite element model comprises 15,000 fully integrated plain stress elements, such Abaqus CPS4 elements, with a default thickness of 1.0 m. Because the elements are plain stress elements, if, for example, one were to change the thickness to 0.1 m or 10.0 m, and also change the load in the thickness direction consistently, then the optimized designs will be similar. The Young modulus is 80 GPa, the Poisson's ratio is 0.342, yield stress assumes isotropic hardening with a constant hardening coefficient being 0.1% of the elastic stiffness. The eigenstrain is estimated to be 0.00810 as the thermal expansion is 9.0 μm/K and an average 3D printing temperature of 900 K is predicted. Thereby, the material properties have the characteristics of a titanium alloy being Ti-6Al-4V.

The topology optimization is constrained to be 25% of the full amount of material. Thus, in the model for the initial design, each design element is filled up with a relative material density of 25% per element and the constitutive material is scaled according to FIG. 7.

Figure 8:
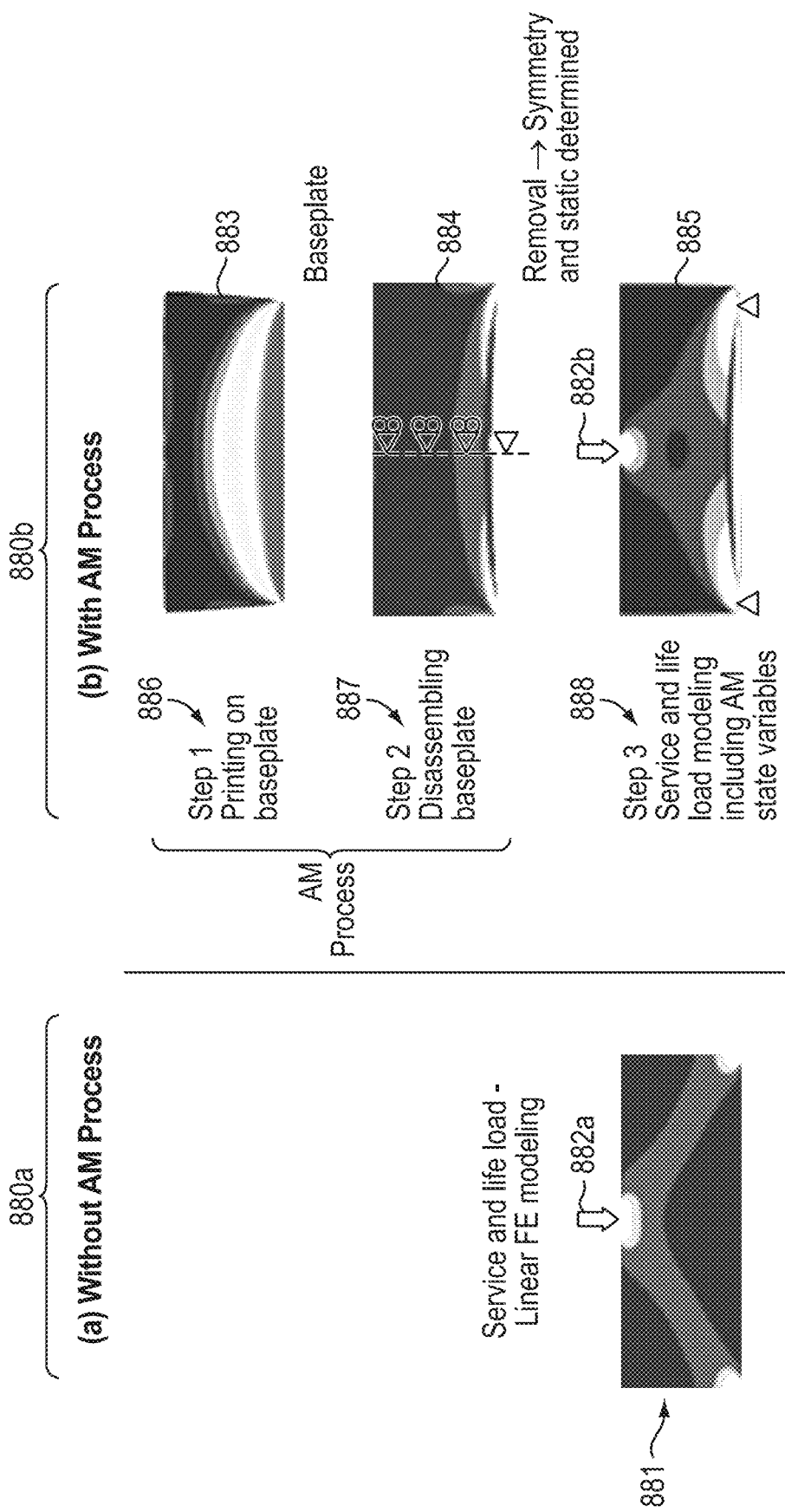
FIG. 8 shows stress plots depicting stresses in an object designed using conventional techniques and designed using principles of an embodiment.

FIG. 8 shows steps and resulting stress plots for model optimization according to the aforementioned assumptions and definitions. The flow 880a shows the simulation and corresponding structure responses via the stress plot 881 of the service and life load 882a for a model optimized without using the state variables from the additive manufacturing process. As can be seen, the flow 880a simply includes optimizing the model itself and the resulting stress plot 881. By contrast, the flow 880b shows the simulation and corresponding structural responses 883, 884, and 885 of the service and life load 882b of a model optimized using the state variables (deformation, stresses, plasticity, material properties) from the additive manufacturing process. The flow 880b considers the state variables from printing on the base plate at step 886 and disassembling from the baseplate at step 887 during the optimization at step 888 of the service and life load optimization.

Figure 9:
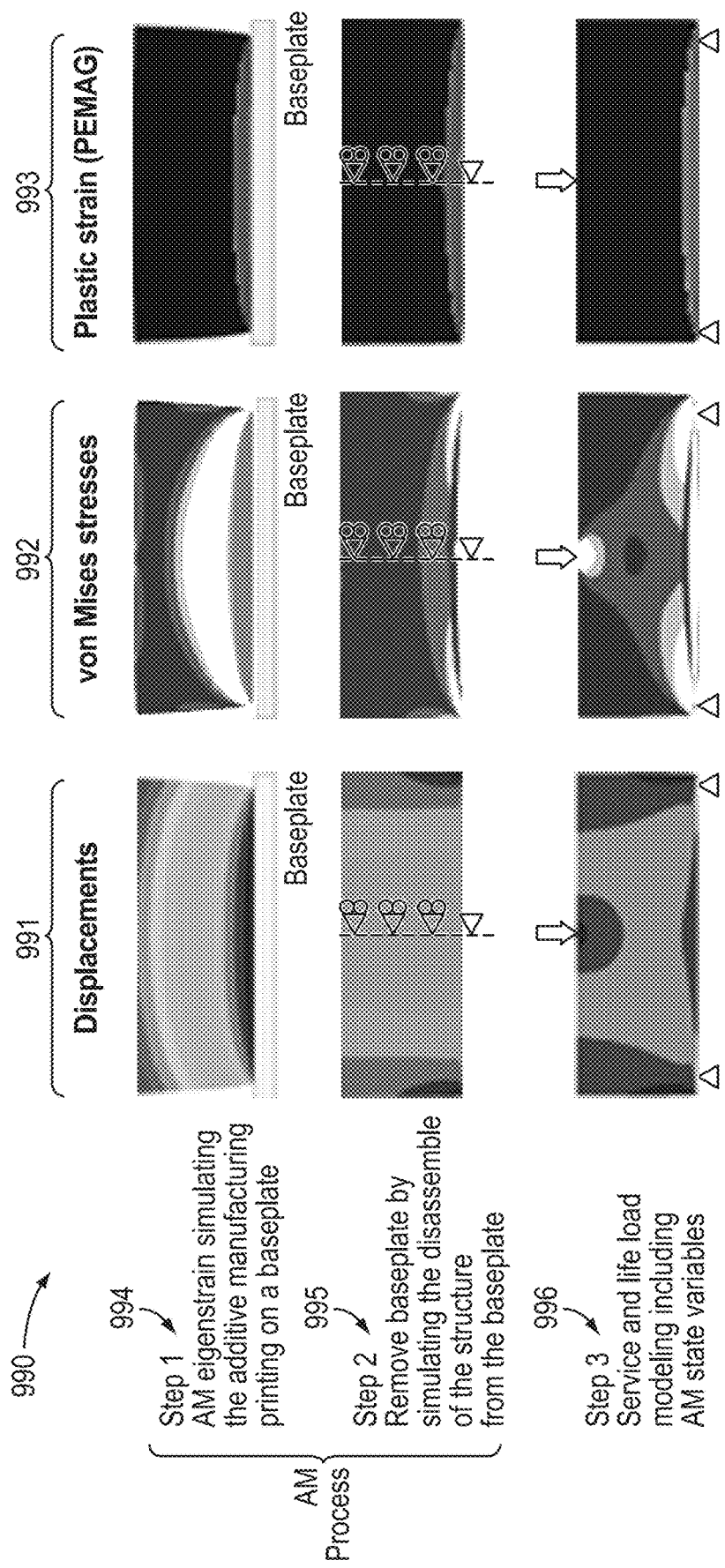
FIG. 9 depicts plots indicating displacements, stresses, and plastic strains in an object during production and deployment where the design of the object was optimized using principles of an example embodiment.

FIG. 9 provides plots 990 of the accumulating state variables, namely displacements (deformations) 991, stresses 992, and accumulated plasticity 993 of the model due to the AM process. The AM process includes printing of the object on the base plate at step 994 and removing the object from the base plate at step 995. Further, the plots 991, 992, and 993, also show the effect of the state variables from steps 994 and 995 of the AM process on deformations, stresses, and accumulated plasticity during step 996. In other words, the plots associated with step 996 illustrate the impact on the structural response analysis of the equilibrium for the service and life loads.

Figure 10:
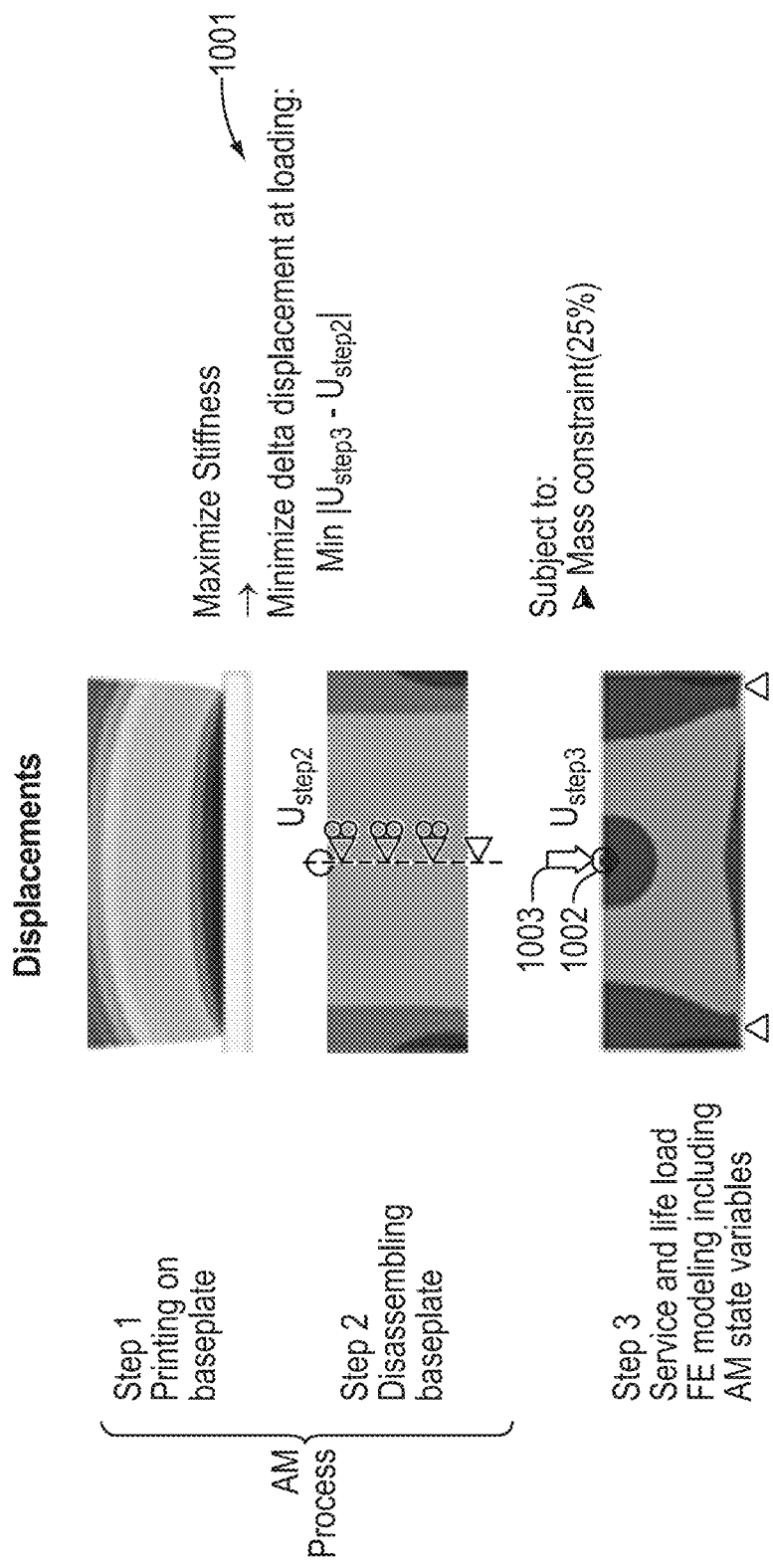
FIG. 10 illustrates stages of equilibriums for an optimization workflow for designing an object produced via additive manufacturing.

For the optimization examples described below, the optimization is executed using the workflow 550 of FIG. 5 using sensitivities including the state variables from the additive manufacturing process. The objective of the example optimization is to maximize the stiffness for the service and life load considering a given mass. Other optimizations are achievable. As shown in FIG. 10, this condition 1001 is defined as minimizing the displacement (Min|$U_{step3}$−$U_{step2}$|) between step 3 (service and life load equilibrium) and step 2 (baseplate disassembling equilibrium) at the node 1002 where the concentrated load 1003 is applied in the direction of this load 1003 for a relative mass constraint of 25%. The stiffness measure defines the stiffness for the component in operation. If, in contrast, the optimization were to exclude the state variables of the additive manufacturing, then the expression is simplified as (Min|$U_{step3}$|) as $U_{step2}$=0.

Figure 11:
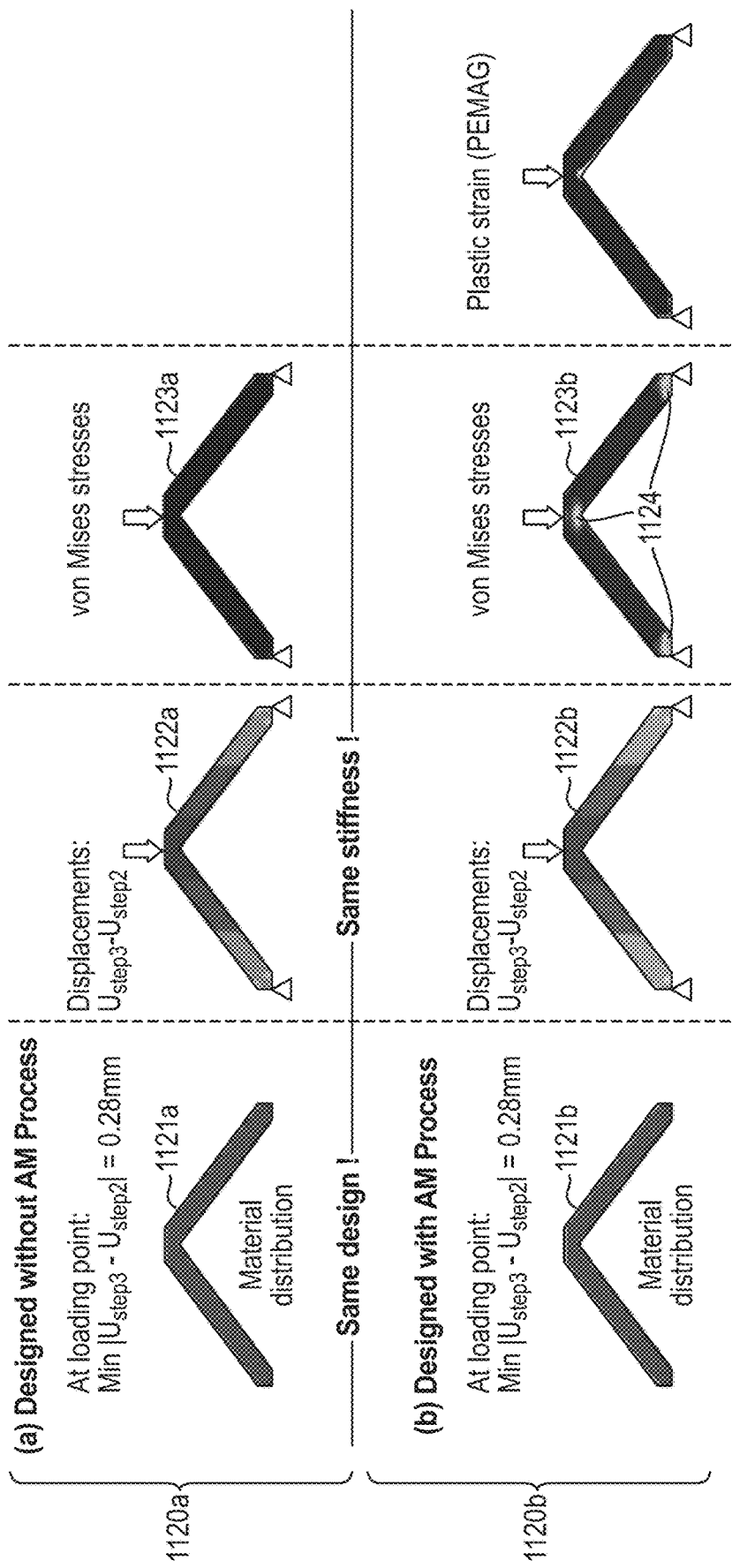
FIG. 11 depicts optimized topologies for an object designed using a conventional optimization method and an object designed using an optimization method performed according the principles of the present invention along with displacements, stresses, and strains of the objects targeting stiffness optimization constrained by a fixed mass.

FIG. 11 depicts an optimized topology 1121a for an optimization workflow 1120a that neglects the state variables of the AM process for the simulation of the service and life load. By contrast, the optimized topology 1121b for the optimization workflow 1120b was determined in an optimization that considered the state variables (deformation, stresses, plasticity, material properties) from the additive manufacturing process, which includes the 3D printing on a baseplate and the disassembling from the baseplate, for the simulation of the service and life load. The results shown in FIG. 11 illustrate that the material distributions 1121a and 1121b for the optimized topologies are nearly identical and it can also be observed that the stiffnesses 1122a and 1122b for the service and life load defined by relative displacements $U_{step3}$−$U_{step2}$ are also nearly identical. However, as shown in FIG. 11 and described in detail herein below, in relation to FIGS. 12 and 13, the stresses 1123a and 1123b are fundamentally different as the accumulated stresses 1123b and plasticity of the AM process cause the critical high stressed hotspots 1124.

Figure 12:
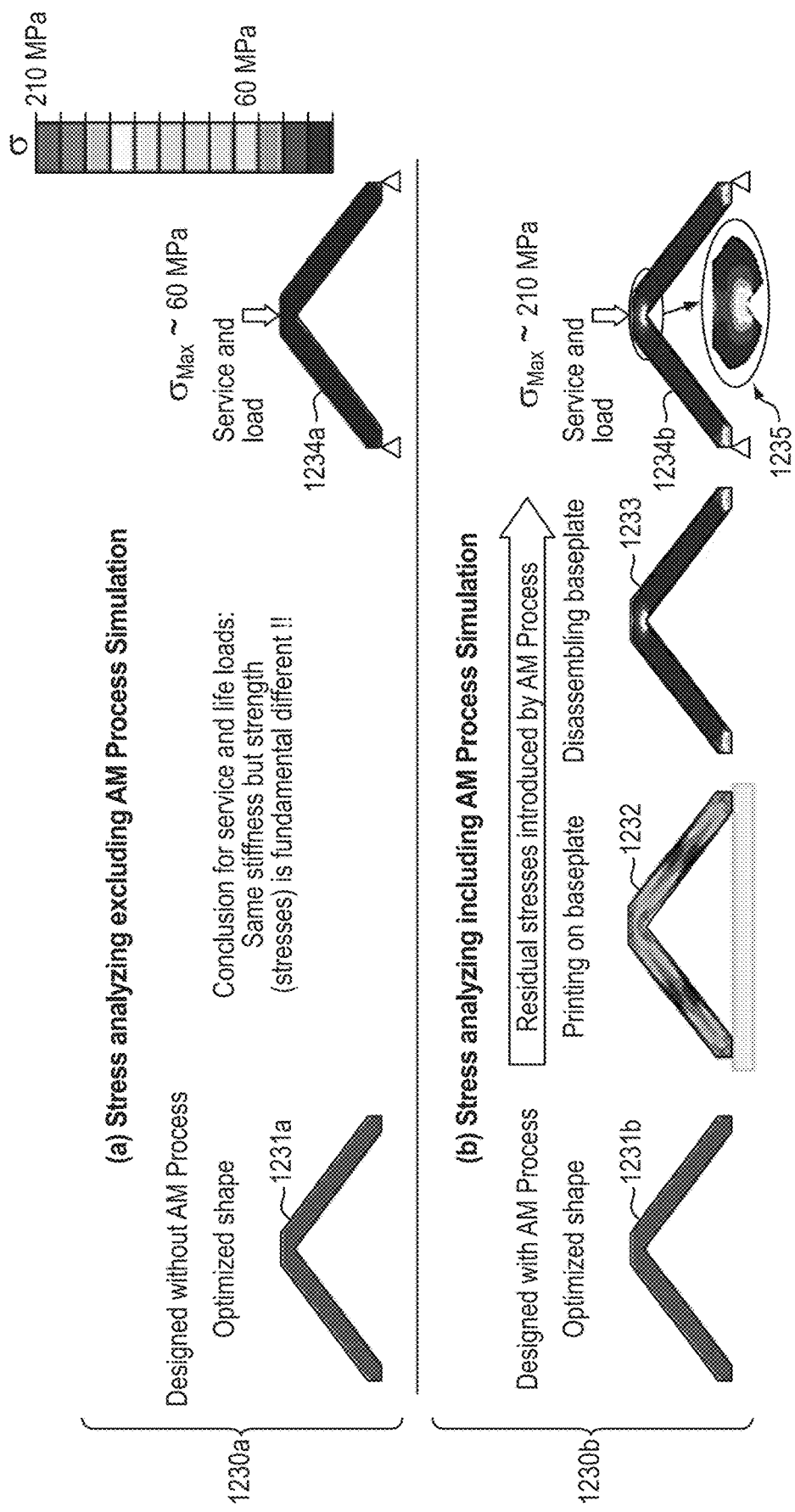
FIG. 12 illustrates stresses in an object designed using an existing method and stresses in an object designed according to the principles described herein through stages of production and use.

FIG. 12 highlights the resulting varying stresses from the designs described hereinabove in relation to FIG. 11, where the optimized topology 1231a was determined without considering state variables from the AM process and the optimized topology 1231b was determined utilizing state variables from the AM process. As shown in FIG. 12 the topologies 1231a and 1231b are nearly identical. In contrast however, the workflow 1230b considers the stresses 1232 induced in the part during printing on the base plate and the stresses 1233 induced in the part when the part is removed from the base plate. Thus, the resulting stress plots 1234a and 1234b when the part is subject to the life load are considerably different. Specifically, the part optimized using the workflow 1230a has a max stress of 60 MPa while the part designed in the workflow 1230b has a max stress of 210 MPa at the stress hotspot 1235.

FIG. 13 shows graphs that illustrate the stiffness and strength in the resulting designs 1231a and 1231b of FIG. 12. The plot 1330a shows the stiffness of the object designed without considering the AM state variables (from 1231a of FIG. 12) and the plot 1330b illustrates the stiffness of the object when the design is determined using the AM state variables (from 1231b of FIG. 12). As can be seen, the stiffness dP/du for each is the same. Specifically, the stiffness tangent coefficients dP/du (1333a and 1333b) for the two cases are the same within the range which the service and life load is operating. The plot 1331a illustrates the strength of the object designed without considering the AM state variables and the plot 1331b illustrates the strength of the object when the design considers the AM state variables. Unlike the stiffness, the stresses 1334b are significantly higher for the service and life loading with the state variables (deformation, stresses, plasticity, material properties) from the additive manufacturing process as compared to the stresses 1334a. Consequently, the stiffness is evaluated to be the same but, the strength properties are evaluated by the stresses to be fundamentally different between neglecting the AM state variables and including the AM state variables in the design process. Thus, illustrating the importance of including the state variables from the AM process in the design process when designing for strength.

Consequently, the stiffness designs for the service and life load excluding and including the state variables of the AM process give the same results for both the material distribution of the optimized topologies and operational stiffness. However, the stress levels (strength) are fundamentally different when analyzing for the service and life load excluding and including the AM process (state variables), respectively. The stress levels (strength) are considered in the next optimization example described herein below. Based upon the present observations, the optimization results described below should be fundamentally different if the service and life load exclude or include the state variables of the AM process.

Figure 14:
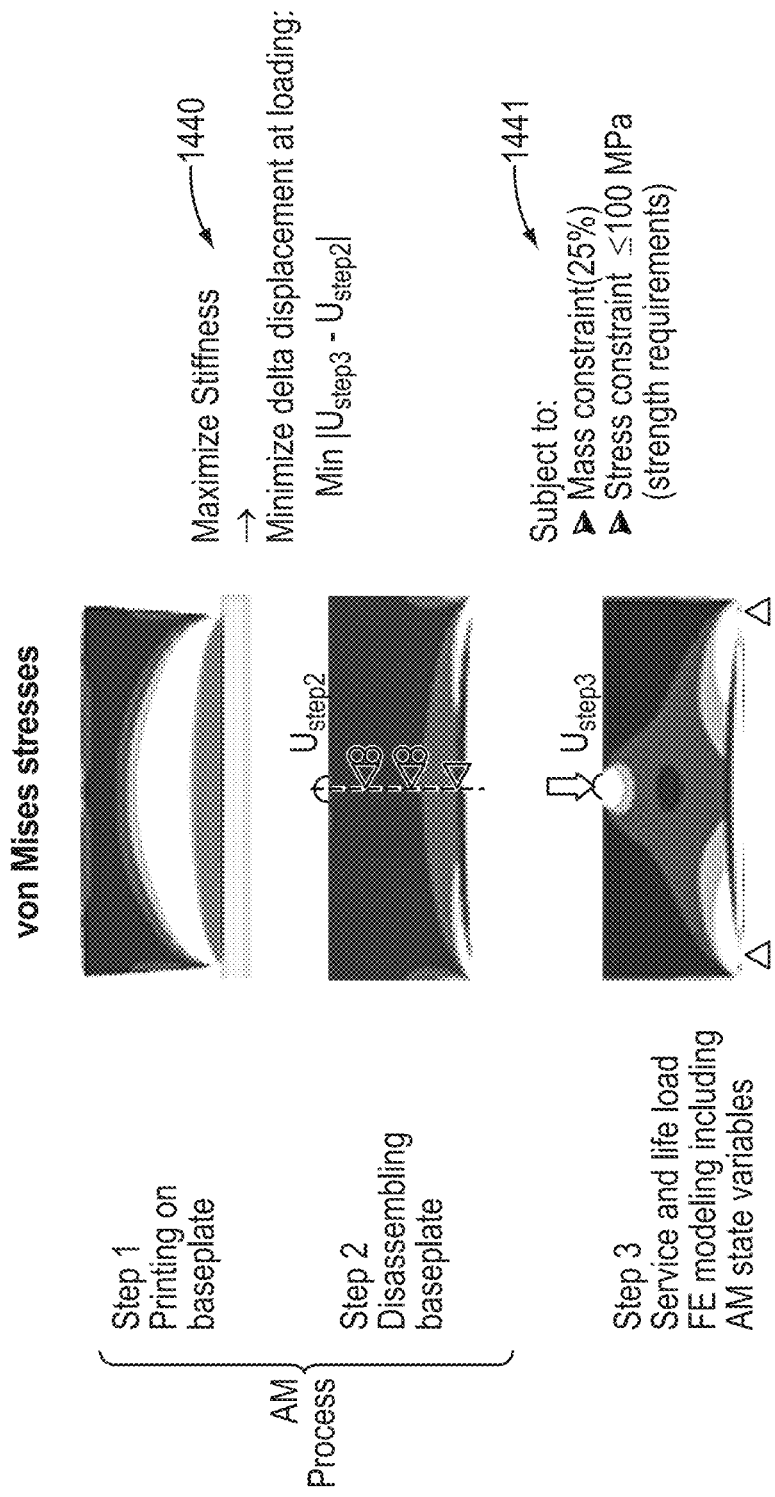
FIG. 14 illustrates stages of equilibriums for an optimization workflow for designing an object produced via additive manufacturing.

Herein below another optimization example is described, which similarly to the optimization of FIG. 10, has the condition 1440, to maximize the stiffness for the service and life load considering a given mass. Likewise, the optimization considers printing the object on the baseplate (step 1), disassembling the object from the base plate (step 2), and, at step 3, service and life load on the object including state variables from the AM process (which comprises steps 1 and 2). However, unlike the aforementioned example, the optimization depicted in FIG. 14 is subject to a strength requirement so a stress constraint 1441 is also added to the optimization formulation.

Figure 15:
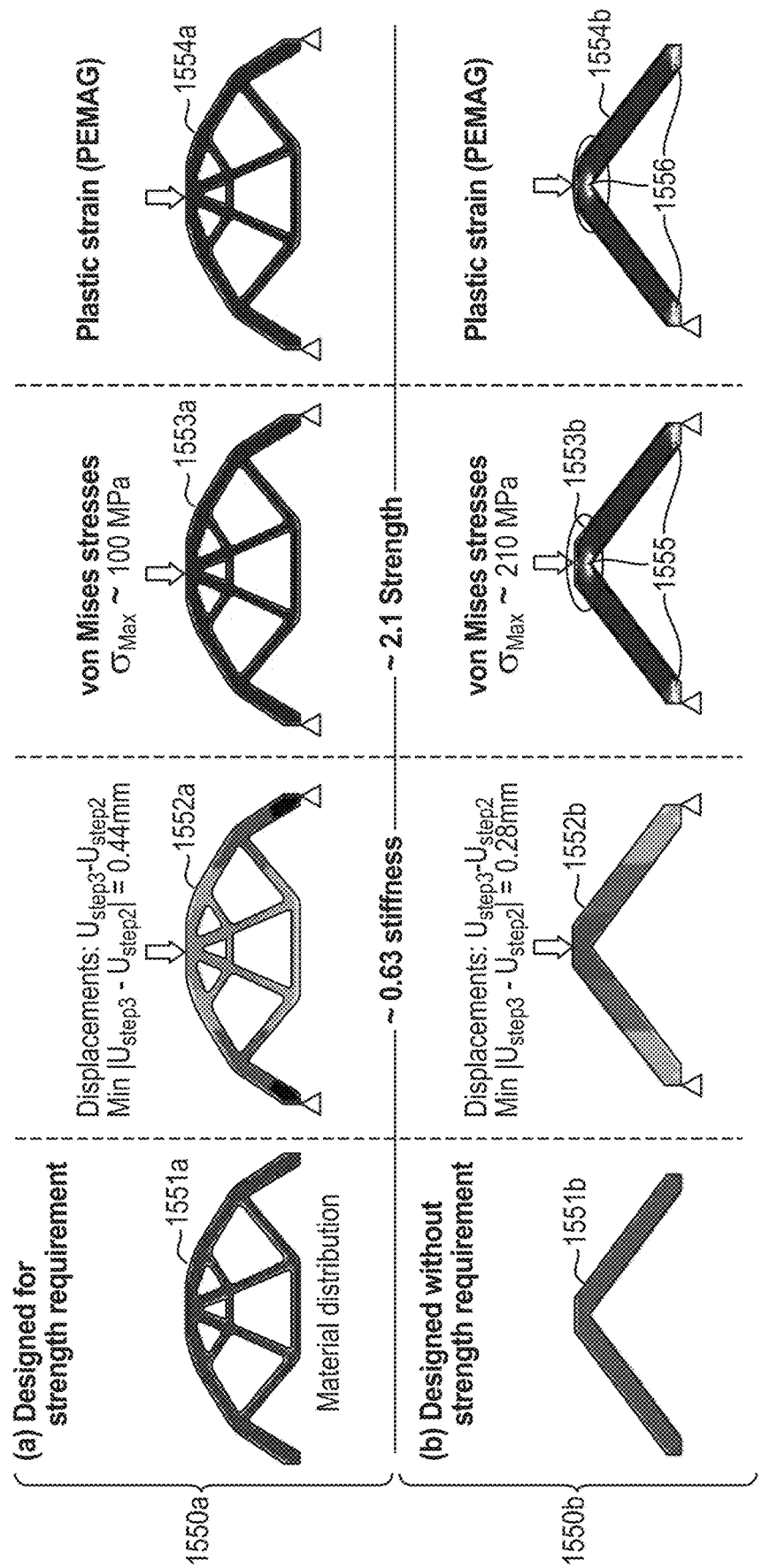
FIG. 15 depicts optimized topologies for objects that were designed according to the principles described herein targeting stiffness and strength optimization using two different constraints in the optimizations for stress level and a fixed mass.

FIG. 15 illustrates the results for an optimization 1550a that includes the stiffness and strength constraint and an optimization 1550b that includes only the stiffness constraint. The results from the workflow 1550a include the material distribution 1551a, displacements 1552a, stresses 1553a, and plastic strain 1554a. The results from the workflow 1550a are contrasted with the results from the workflow 1550b which were determined for a similar optimization problem but, which did not include the stress constraint 1441 to yield the material distribution 1551b, displacements 1552b, stresses 1553b, and plastic strain 1554b. The two sets of results from the workflows 1550a and 1550b shown in FIG. 15 are rather different both in terms of the material distributions 1551a and 1551b for the optimized topologies as well as the stress levels 1553a and 1553b and deformation patterns 1552a and 1552b and thereby, the stiffness for the service and life loads. The results from the workflows 1550a and 1550b were determined by including the state variables (deformation, stresses, plasticity, material properties) of the AM process for the service and life load but the workflow 1550a considered the stress constraint (strength requirement) and the optimized topology workflow 1550b did not consider the stress constraint (strength requirement). Additionally, the optimization result (or resulting design) 1550b has several critical high stressed 1555 and high plastic strain hotspots 1556 as compared to the stress results 1553a and plastic strain results 1554a of the optimization results (resulting design) 1551a.

Figure 16:
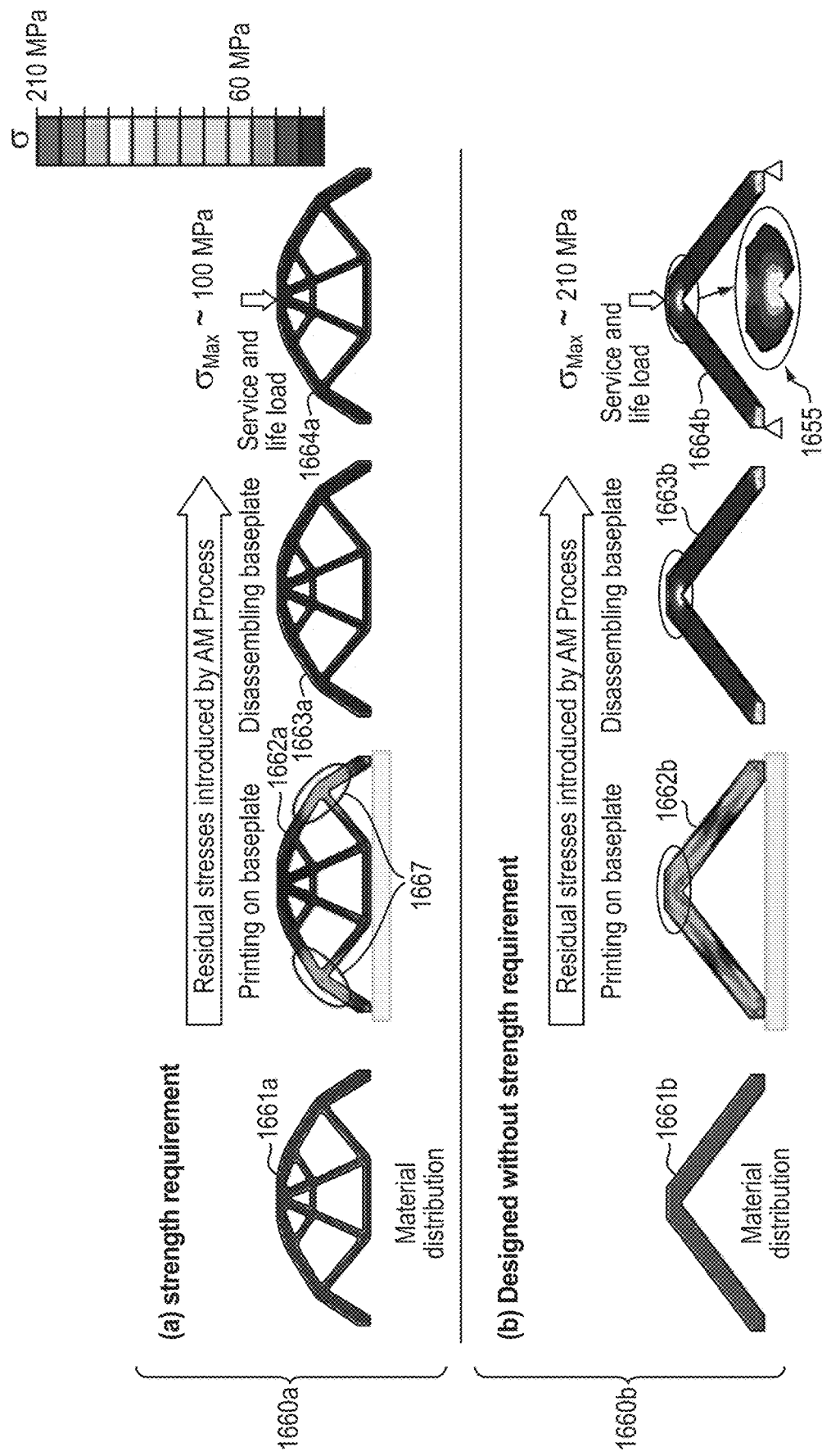
FIG. 16 illustrates stresses in an object designed using an existing method and stresses in an object designed according to the principles of an embodiment described herein through stages of production and use.

FIG. 16 illustrates results of a detailed numerical study for the stress hotspots 1555 (of FIG. 15) accumulated from the additive manufacturing process consisting of the 3D printing process on a base plate and the disassembling from the baseplate for the aforementioned optimization as well as how these stresses from the additive manufacturing process are the basis for the stresses within the stress distribution for the service and life load. FIG. 16 illustrates the stress progression 1662a, 1663a, and 1664a throughout the additive manufacturing process for the material distribution 1661a in an optimization workflow 1660a that includes the strength requirement. Likewise, FIG. 16 illustrates the stress progression 1662b, 1663b, and 1664b, through the additive manufacturing process for the material distribution 1661b in an optimization workflow 1660a that does not include the strength requirement.

Comparing the stresses 1664a and 1664b for the two designs 1661a and 1661b illustrates the importance of including the state variables of the AM process for the optimization. In particular, note that the stresses 1664a from both the 3D printing process on a base plate and the disassembling from the base plate are significantly reduced for the design 1661a (which included the stress constraint) as compared to the stresses 1664b of the design 1661b (which did not include the stress constraint). This result makes sense because the inherited stresses of the AM process are the main basis for the stress level of the service and the life load. Additionally, the hotspots 1667 of the AM process for the design determined with the stress constraint are located differently than the hotspots caused by the service and life load and thereby, the overall stress is homogenized and a general reduction of the stress level is obtained.

FIG. 17 shows graphs that illustrate the stiffness and strength in the resulting designs 1551a and 1551b of FIG. 15 that were determined with the strength requirement and without the strength requirement, respectively. The plot 1770a illustrates the stiffness of the object designed without the strength requirement and the plot 1770b illustrates the stiffness of the object when the design was determined with the strength requirement. The plot 1771a illustrates the strength of the object designed without the strength requirement and the plot 1771b illustrates the strength of the object when the design was determined with the strength requirement. The plots 1770a and 1770b illustrate that the design optimized strictly for stiffness (1770a) has a higher stiffness than the design simultaneously optimized for strength (stress constraints) and stiffness (1770b) but, has significantly higher stresses as shown by the plots 1771a and 1771b. This can be seen as the stiffness tangent coefficient dP/du 1772a is higher than the stiffness tangent coefficient 1772b and the strength, evaluated by the stresses 1773a and 1773b is higher for the design determined with the strength constraint. The results illustrate that as a consequence of being designed with the strength requirement, said design has significantly lowered stiffness. These results illustrate the importance of including the state variables from the AM process in the design process when designing for strength as it can be seen that the strength can be significantly improved as the critical high stressed hotspots in the service and life load equilibrium caused by the accumulated state variables as stresses and plasticity of the AM process are removed. Including the strength design requirement causes the stiffness to be lower than the design having no strength design requirement.

Consequently, (a) the critical high stressed hotspots in the service and life load equilibrium caused by the accumulated state variables as stresses and plasticity of the AM process are removed by the optimization and (b) the material distribution of optimized topology is fundamentally different compared to the material distribution of the optimized topology when strictly optimizing for stiffness both when including and excluding the state variables of the AM process. However, the correct design for the service and life load can only be obtained consistently for strength designing when consistently including the state variables of the AM process for the service and life load equilibrium.

Figure 18:
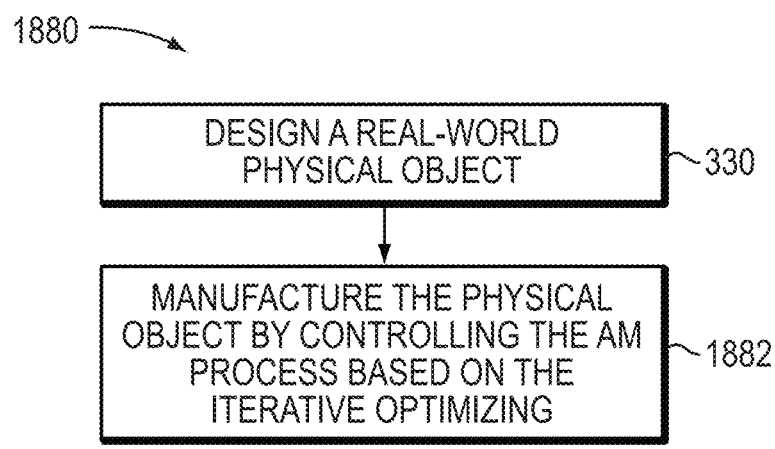
FIG. 18 is a flowchart of a method for producing a physical object using principles of embodiments.

FIG. 18 is a flowchart of a method 1880 for manufacturing a physical object according to the principles of embodiments described herein. The method 1880 begins with performing the method 330 for designing a physical object. As described hereinabove in relation to FIG. 3, the method 330 designs a real-world physical object through iterative optimization, while accounting for properties of an AM process for producing the real-world physical object. Thus, the object design resulting from step 330 of the method 1880 is for an object that is manufactured according to a specific AM process. For instance, the resulting design may be for an object produced through additive manufacturing at a particular temperature and with a particular printing path. It is noted that while the method 1880 begins with designing a physical object according to the method 330, the method 1880 may instead design the physical object according to any method described herein.

To continue, at step 1882 the physical object is manufactured by controlling the AM process based on the iterative optimizing of the step 330. In other words, at step 1882 the method 1880 controls an AM device to create the designed physical object that results from step 330. The object is created at step 1882 according to the parameters of the AM process under which the physical object was designed. Thus, if the object is designed based upon being manufactured at a particular temperature and according to a particular printing path, at step 1882, the physical object is manufactured at that temperature and using that printing path.

Figure 19:
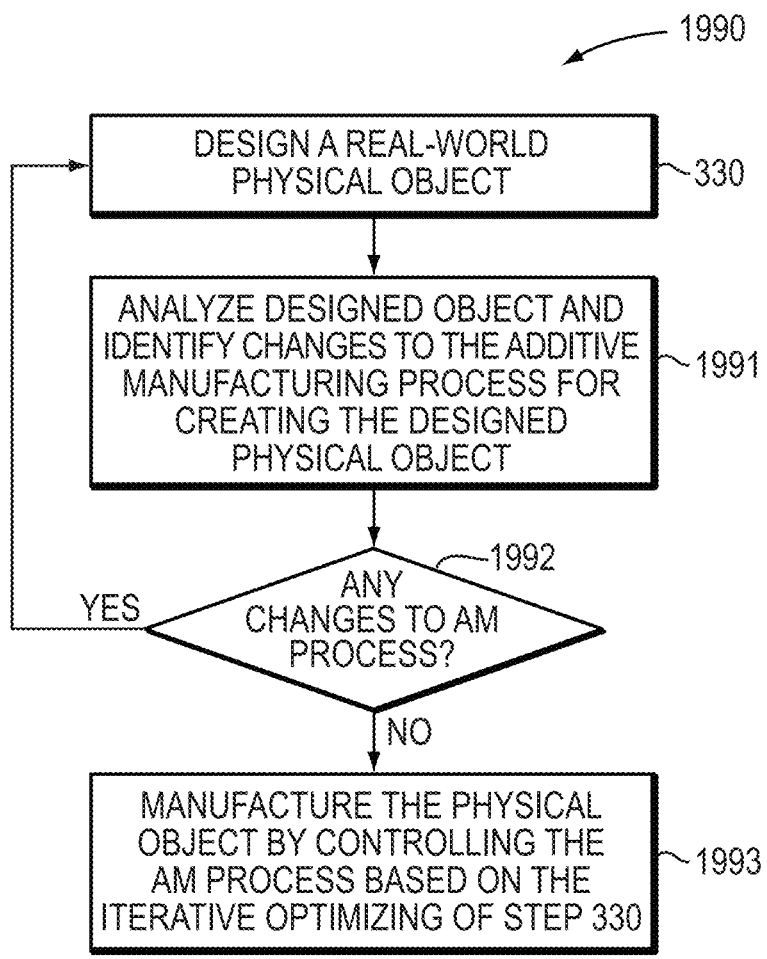
FIG. 19 is a flowchart of a method of designing and producing a physical object and designing an AM process for producing the physical object.

FIG. 19 is a flowchart of a method 1990 for designing an object. Like the method 1880, the method 1990 begins with performing the method 330 so as to design a real-world physical object, through iterative optimization, while accounting for properties of an AM process for producing the real-world physical object. At step 1991, the designed object is analyzed and any changes to the AM process for creating the designed object are identified. Identified changes may include reducing the AM manufacturing time or reducing the residual stresses, the warping, or the material anisotropicity of the AM produced component. Further, additional changes may also include modifying the shape of the object, the AM path, AM speed, and power and intensity of the energy source used for the AM, as well as the nature of support structures used in the AM process. Amongst other examples, changes identified at step 1991 may be identified to (i) reduce manufacturing distortions and residual stresses, (ii) modify the metallurgical microstructures of the object, and (iii) improve surface roughness. Identified changes can both improve the AM process itself and also help to design a higher quality real-world object from a stiffness, strength, and fatigue life perspective. Step 1991 may include performing physical or numerical experiments for the additive manufacturing process to identify such changes.

At step 1992, if no changes to the AM process are identified the method 1990 continues to step 1993 and the physical object is manufactured based on the iterative optimizing of step 330. At step 1992, if changes to the AM process have been identified, the method 1990 returns to step 330. Upon returning, the method 330 is carried out with the identified changes to the AM process.

Figure 20:
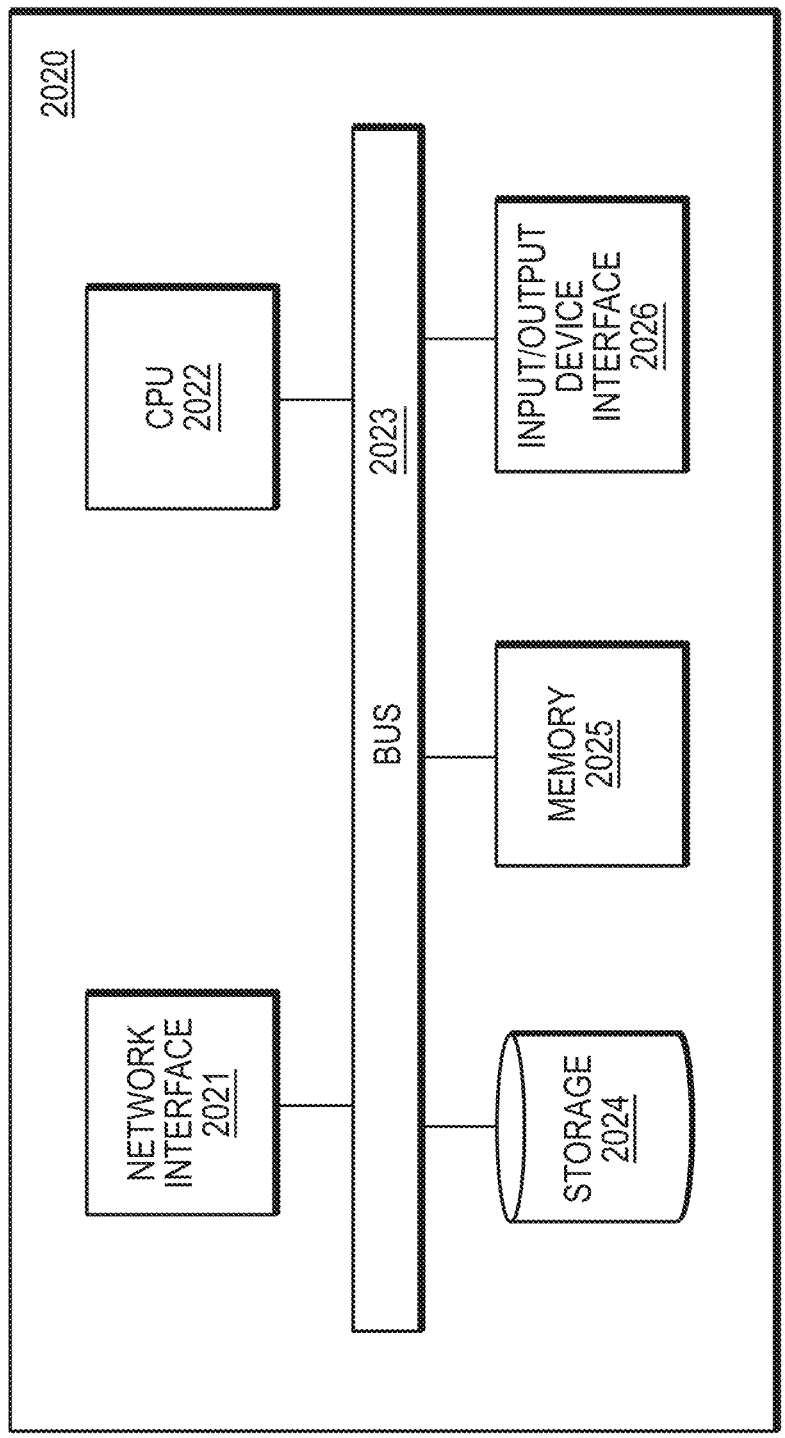
FIG. 20 is a simplified block diagram of a system for designing an object according to an example embodiment.

FIG. 20 is a simplified block diagram of a computer-based system 2020 that may be used to generate and optimize a real-world object according to any variety of the embodiments of the present invention described herein. The system 2020 comprises a bus 2023. The bus 2023 serves as an interconnect between the various components of the system 2020. Connected to the bus 2023 is an input/output device interface 2026 for connecting various input and output devices such as a keyboard, mouse, display, speakers, etc. to the system 2020. A central processing unit (CPU) 2022 is connected to the bus 2023 and provides for the execution of computer instructions. Memory 2025 provides volatile storage for data used for carrying out computer instructions. Storage 2024 provides non-volatile storage for software instructions, such as an operating system (not shown). The system 2020 also comprises a network interface 2021 for connecting to any variety of networks known in the art, including wide area networks (WANs) and local area networks (LANs).

It should be understood that the example embodiments described herein may be implemented in many different ways. In some instances, the various methods and machines described herein may each be implemented by a physical, virtual, or hybrid general purpose computer, such as the computer system 2020, or a computer network environment such as the computer environment 2030, described herein below in relation to FIG. 21. The computer system 2020 may be transformed into the machines that execute the methods described herein, for example, by loading software instructions into either memory 2025 or non-volatile storage 2024 for execution by the CPU 2022. In further example, the computer system 2020 or CPU 2022 may form operative portions of a CAD/CAE system improved by embodiments of the present invention. Other systems for designing/manufacturing real-world objects are suitable. One of ordinary skill in the art should further understand that the system 2020 and its various components may be configured to carry out any embodiments or combination of embodiments of the present invention described herein. Further, the system 2020 may implement the various embodiments described herein utilizing any combination of hardware, software, and firmware modules operatively coupled, internally, or externally, to the system 2020. Further, the system 2020 may be communicatively coupled to or be embedded within an additive manufacturing device so as to control the device to create a physical object as described herein.

Figure 21:
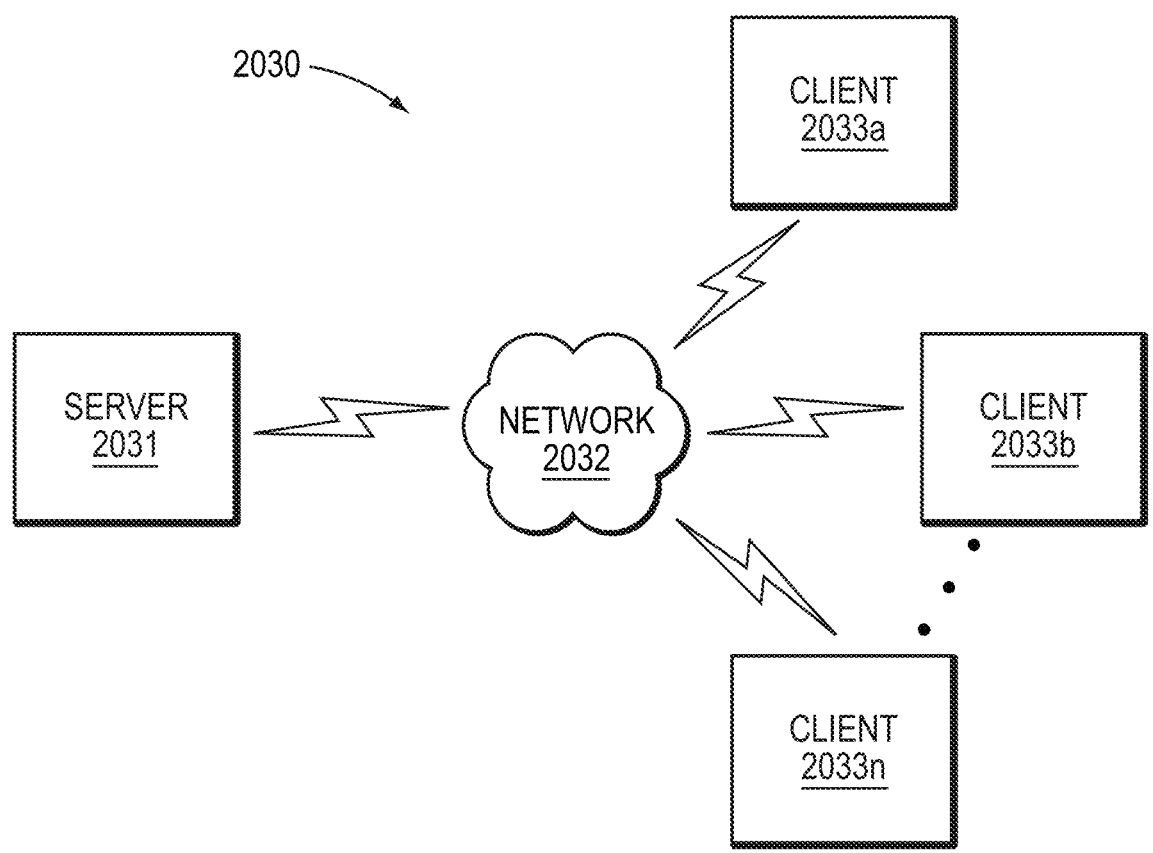
FIG. 21 is a simplified diagram of a computer network environment in which an embodiment of the present invention may be implemented.

FIG. 21 illustrates a computer network environment 2030 in which an embodiment of the present invention may be implemented. In the computer network environment 2030, the server 2031 is linked through the communications network 2032 to the clients 2033a-n. The environment 2030 may be used to allow the clients 2033a-n, alone or in combination with the server 2031, to execute any of the methods described herein. For non-limiting example, computer network environment 2030 provides cloud computing embodiments, software as a service (SAAS) embodiments, and the like.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method of designing a real-world physical object, the method comprising:
   defining, in memory of a processor, a first model of a physical object being produced using an additive manufacturing (AM) process, the first model comprising a first plurality of design variables where behavior of the physical object being produced using the AM process is given by a first equation which includes a first plurality of corresponding sensitivity equations for the first plurality of design variables;
   simulating production of the physical object through the AM process using the defined first model and simulating removal of the physical object from a baseplate, the simulation includes terms representing the stresses induced in the part during printing on the base plate and terms representing the stresses induced in the part when the part is removed from the base plate;
   using results from the simulation of producing the physical object through the AM process, defining, in the memory, a second model of the physical object after being produced using the AM process and removed from the baseplate, the second model comprising a second plurality of design variables where behavior of the physical object after being produced using the AM process and removed from the baseplate is given by a second equation which includes a second plurality of corresponding sensitivity equations for the second plurality of design variables;
   by the processor, iteratively optimizing the second model of the physical object with respect to a given one of the second plurality of design variables using both the first plurality of corresponding sensitivity equations for the first plurality of design variables and the second plurality of corresponding sensitivity equations for the second plurality of design variables;
   determining that the optimization has converged; and
   generating a computer program product comprising a final design of the converged model, the computer program product readable by an AM machine to manufacture a physical object that conforms to the optimized design.

2. The method of claim 1 wherein using results from the simulation of producing the physical object through the AM process in defining the second model includes:
updating a value for a given design variable from the second plurality of design variables using the results.

3. The method of claim 1 wherein at least one of the first plurality of corresponding sensitivity equations and the second plurality of corresponding sensitivity equations are adjoint sensitivity equations.

4. The method of claim 1 further comprising: manufacturing the physical object by controlling the AM process based on the iterative optimizing.

5. The method of claim 1 further comprising:
modifying the AM process based on the iterative optimizing; and
manufacturing the physical object using the modified AM process, design of the physical object manufactured using the modified AM process based on the iterative optimizing.

6. The method of claim 1 wherein the design variables include at least one of: a dimension, a thickness, a width, a radius, a composite material angle, a sizing variable, a material interpolation variable for topology, a shape variable, and a bead variable.

7. The method of claim 1 wherein using the first plurality of corresponding sensitivity equations in iteratively optimizing the second model accounts for at least one of: a stress, a material parameter, a microstructure, and a deformation induced in the physical object by the AM process.

8. The method of claim 1 wherein the iterative optimizing optimizes the second model with respect to at least one of: a service load and a life load.

9. The method of claim 1 wherein the first plurality of design variables includes variables from the AM process and the iterative optimizing includes recalculating influence, on the AM process, of said design variables from the AM process in each optimization iteration using a consistent sensitivity-based approach.

10. The method of claim 1 wherein iteratively optimizing the second model optimizes at least one of: a structural, a computational fluid dynamics (CFD), a thermo-mechanical, an electro-mechanical, an electromagnetic, an acoustic, and a fluid-structural response of the second model.

11. A system for designing a real-world physical object, the system comprising:
a processor; and
a memory with computer code instructions stored thereon, the processor and the memory with the computer code instructions being configured to cause the system to:
define, in the memory, a first model of a physical object being produced using an additive manufacturing (AM) process, the first model comprising a first plurality of design variables where behavior of the physical object being produced using the AM process is given by a first equation which includes a first plurality of corresponding sensitivity equations for the first plurality of design variables;
simulate production of the physical object through the AM process using the defined first model and simulate removal of the physical object from a baseplate, the simulation includes terms representing the stresses induced in the part during printing on the base plate and terms representing the stresses induced in the part when the part is removed from the base plate;
using results from the simulation of producing the physical object through the AM process, define, in the memory, a second model of the physical object after being produced using the AM process and removed from the baseplate, the second model comprising a second plurality of design variables where behavior of the physical object after being produced using the AM process and removed from the baseplate is given by a second equation which includes a second plurality of corresponding sensitivity equations for the second plurality of design variables;
updating a value for a given design variable from the second plurality of design variables using the results;
iteratively optimize the second model of the physical object with respect to a given one of the second plurality of design variables using both the first plurality of corresponding sensitivity equations for the first plurality of design variables and the second plurality of corresponding sensitivity equations for the second plurality of design variables;
determine that the optimization has converged; and
generate a computer program product comprising a final design of the converged model, the computer program product readable by an AM machine to manufacture a physical object that conforms to the optimized design.

12. The system of claim 11 wherein at least one of the first plurality of corresponding sensitivity equations and the second plurality of corresponding sensitivity equations are adjoint sensitivity equations.

13. The system of claim 11 where the processor and the memory, with the computer code instructions, are further configured to cause the system to: manufacture the physical object by controlling the AM process based on the iterative optimizing.

14. The system of claim 11 where the processor and the memory, with the computer code instructions, are further configured to cause the system to:
modify the AM process based on the iterative optimizing; and
manufacture the physical object using the modified AM process, design of the physical object manufactured using the modified AM process based on the iterative optimizing.

15. The system of claim 11 wherein using the first plurality of corresponding sensitivity equations in iteratively optimizing the second model accounts for at least one of: a stress, a material parameter, a microstructure, and a deformation induced in the physical object by the AM process.

16. The system of claim 11 wherein the iterative optimizing optimizes the second model with respect to at least one of: a service load and a life load.

17. The system of claim 11 wherein the first plurality of design variables includes variables from the AM process and the iterative optimizing includes recalculating influence, on the AM process, of said design variables from the AM process in each optimization iteration using a consistent sensitivity-based approach.

18. A computer program product for designing a real-world physical object, the computer program product executed by a server in communication across a network with one or more clients and comprising:
a non-transitory computer readable medium, the non-transitory computer readable medium comprising program instructions which, when executed by a processor, causes the processor to:
define, in memory of the processor, a first model of a physical object being produced using an additive manufacturing (AM) process, the first model comprising a first plurality of design variables where behavior of the physical object being produced using the AM process is given by a first equation which includes a first plurality of corresponding sensitivity equations for the first plurality of design variables;

simulate production of the physical object through the AM process using the defined first model and simulate removal of the physical object from a baseplate, the simulation includes terms representing the stresses induced in the part during printing on the base plate and terms representing the stresses induced in the part when the part is removed from the base plate;

using results from the simulation of producing the physical object through the AM process, define, in the memory, a second model of the physical object after being produced using the AM process and removed from the baseplate, the second model comprising a second plurality of design variables where behavior of the physical object after being produced using the AM process and removed from the baseplate is given by a second equation which includes a second plurality of corresponding sensitivity equations for the second plurality of design variables;

iteratively optimize the second model of the physical object with respect to a given one of the second plurality of design variables using both the first plurality of corresponding sensitivity equations for the first plurality of design variables and the second plurality of corresponding sensitivity equations for the second plurality of design variables;

determine that the optimization has converged; and generate a computer program product comprising a final design of the converged model, the computer program product readable by an AM machine to manufacture a physical object that conforms to the optimized design.

* * * * *